United States Patent
Hara et al.

(10) Patent No.: US 8,050,142 B2
(45) Date of Patent: Nov. 1, 2011

(54) SOUND COLLECTION ENVIRONMENT DECIDING DEVICE, SOUND PROCESSING DEVICE, ELECTRONIC APPLIANCE, SOUND COLLECTION ENVIRONMENT DECIDING METHOD AND SOUND PROCESSING METHOD

(75) Inventors: Kazuma Hara, Daito (JP); Makoto Yamanaka, Kobe (JP); Masahiro Yoshida, Osaka (JP); Tomoki Oku, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 438 days.

(21) Appl. No.: 12/328,353

(22) Filed: Dec. 4, 2008

(65) Prior Publication Data

US 2009/0147624 A1 Jun. 11, 2009

(30) Foreign Application Priority Data

Dec. 6, 2007 (JP) ................................. 2007-315395
Apr. 17, 2008 (JP) ................................. 2008-107454
Apr. 17, 2008 (JP) ................................. 2008-107920

(51) Int. Cl.
*H04B 11/00* (2006.01)
*H04N 5/225* (2006.01)

(52) U.S. Cl. ...................................................... 367/131

(58) Field of Classification Search .................. 367/135, 367/131; 348/81
See application file for complete search history.

(56) References Cited

U.S. PATENT DOCUMENTS

2009/0147624 A1* 6/2009 Hara et al. ..................... 367/131

FOREIGN PATENT DOCUMENTS

| JP | 7-30790 A | 1/1995 |
| JP | 7-287286 A | 10/1995 |
| JP | 8-130494 A | 5/1996 |
| JP | 8-278800 A | 10/1996 |
| JP | 9-55778 A | 2/1997 |

OTHER PUBLICATIONS

Machine Translation of JP07030790.*

* cited by examiner

*Primary Examiner* — Daniel Pihulic
(74) *Attorney, Agent, or Firm* — NDQ&M Watchstone LLP

(57) ABSTRACT

A sound collection environment deciding device for deciding whether the sound was collected in air or in water by utilizing an audio signal of collected sound is provided. Methods of Utilizing the audio signal of collected sound include, for instance, utilizing a difference of frequency characteristics between in-air and in-water of the audio signal of collected sound, utilizing a difference of propagation characteristics between in-air and in-water of the audio signal of collected sound, or the like.

18 Claims, 22 Drawing Sheets

SOUND COLLECTION ENVIRONMENT DECIDING DEVICE, SOUND PROCESSING DEVICE, ELECTRONIC APPLIANCE, SOUND COLLECTION ENVIRONMENT DECIDING METHOD AND SOUND PROCESSING METHOD

This nonprovisional application claims priority under 35 U.S.C. §119(a) on Patent Application No. 2007-315395 filed in Japan on Dec. 6, 2007, Patent Application No. 2008-107454 filed in Japan on Apr. 17, 2008 and Patent Application No. 2008-107920 filed in Japan on Apr. 17, 2008, the entire contents of which are hereby incorporated by reference.

BACKGROUND OF THE INVENTION

1. Field of the Invention

The present invention relates to a sound collection environment deciding device for deciding whether the sound collection was performed in air or in water, an electronic appliance having the same (e.g., an imaging apparatus, an IC Recorder or the like), and a sound collection environment deciding method. Furthermore, the present invention relates to a sound processing device equipped with the sound collection environment deciding device, for processing an audio signal of sound collected in water, an electronic appliance having the same, and a sound processing method.

2. Description of Related Art

Conventionally, various types of imaging apparatuses are proposed, which has a waterproof structure for imaging in water and is equipped with an imaging environment deciding device for deciding whether the imaging environment is in air or in water.

For instance, there is an apparatus that includes a pressure sensor attached to the apparatus main body for deciding whether or not it is in water so as to decide the imaging environment. In other words, this apparatus uses the pressure sensor for deciding whether or not it is in water as an imaging environment deciding device for deciding whether the imaging environment is in air or in water.

In addition, there is another apparatus in which in-water deciding means including light projecting means and light receiving means decide whether or not it is in water based on an amount of light received by the light receiving means after projected by the light projecting means, utilizing a difference of light refractive index between water and air, so as to decide the imaging environment. In other words, this apparatus uses the in-water deciding means including the light projecting means and the light receiving means as the imaging environment deciding device for deciding whether the imaging environment is in air or in water.

However, since the above-mentioned imaging environment deciding device needs the additional special component for deciding the imaging environment such as the pressure sensor or the in-water deciding means including the light projecting means and the light receiving means, there is a problem that it is difficult to reduce the size or the cost of the apparatus main body including the imaging environment deciding device. In addition, there is another problem that it can be applied only for imaging and recording but for reproducing the imaged data since it can decide only in the period while the apparatus main body including the imaging environment deciding device is in water.

In addition, since sound collection characteristics in water are substantially different from sound collection characteristics in air, an audio signal of sound collected in water by using an electronic appliance is substantially different from an audio signal of sound collected in air. Therefore, there is a problem that an audio signal that is different from the user's intention may be generated in such a way that the sound is very hard to listen or a grating sound when the audio signal of sound collected in water is reproduced.

SUMMARY OF THE INVENTION

A sound collection environment deciding device according to the present invention utilizes an audio signal of collected sound so as to decide whether the sound was collected in air or in water.

In addition, an electronic appliance according to the present invention is equipped with the sound collection environment deciding device described above and performs characteristic correction suitable for in-water environment when the sound collection environment deciding device has decided that the sound collection was performed in water.

In addition, a sound collection environment deciding method according to the present invention includes utilizing an audio signal of collected sound so as to decide whether the sound collection was performed in air or in water.

In addition, a sound processing device according to the present invention includes:

the sound collection environment deciding device described above; and an in-water characteristic correction device for performing an in-water characteristic correction process on an input audio signal so as to reduce an influence of sound collection characteristics in water to the audio signal, wherein the in-water characteristic correction device performs the in-water characteristic correction process on the input audio signal when the sound collection environment deciding device decides that the input audio signal is sound collected in water.

In addition, the electronic appliance according to the present invention includes the sound processing device described above and corrects the audio signal obtained by the sound collection with the sound processing device.

In addition, a sound processing method according to the present invention includes:

a first step of deciding whether or not the audio signal is obtained by sound collection in water, based on an input audio signal; and a second step of performing an in-water characteristic correction process on the input audio signal so as to reduce an influence of sound collection characteristics in water to the audio signal when it is decided in the first step that the input audio signal is obtained by sound collection in water.

DETAILED DESCRIPTION OF THE PREFERRED EMBODIMENTS

Hereinafter, embodiments of the present invention will be described with reference to the attached drawings.

As to a sound collection environment decision for deciding whether the sound collection was performed in air or in water, a sound collection environment deciding method according to the present invention utilizes an audio signal of collected sound in order to realize downsizing and a cost reduction of the apparatus. Since the audio signal of collected sound is used for the sound collection environment decision, it is not necessary to provide a new special component for the sound collection environment decision. Therefore, downsizing and a cost reduction of the apparatus can be realized. Forms of utilizing the audio signal of collected sound may include, for instance, utilizing a difference between frequency characteristics in air and the same in water of the audio signal of collected sound, utilizing a difference between propagation characteristics in air and the same in water of the audio signal of collected sound, and the like.

In addition, the sound collection environment deciding method according to the present invention performs the sound collection environment decision by utilizing the audio signal of collected sound. Therefore, it can be applied not only to the case of recording the audio signal of collected sound but also to the case of reproducing the audio signal that is already obtained by sound collection and is recorded.

Hereinafter, the sound collection environment deciding method according to the present invention will be described with reference to an example of an imaging apparatus (e.g., a video camera, a digital camera or the like) equipped with the sound collection environment deciding device that was used for recording the audio signal of collected sound.

Figure 1:
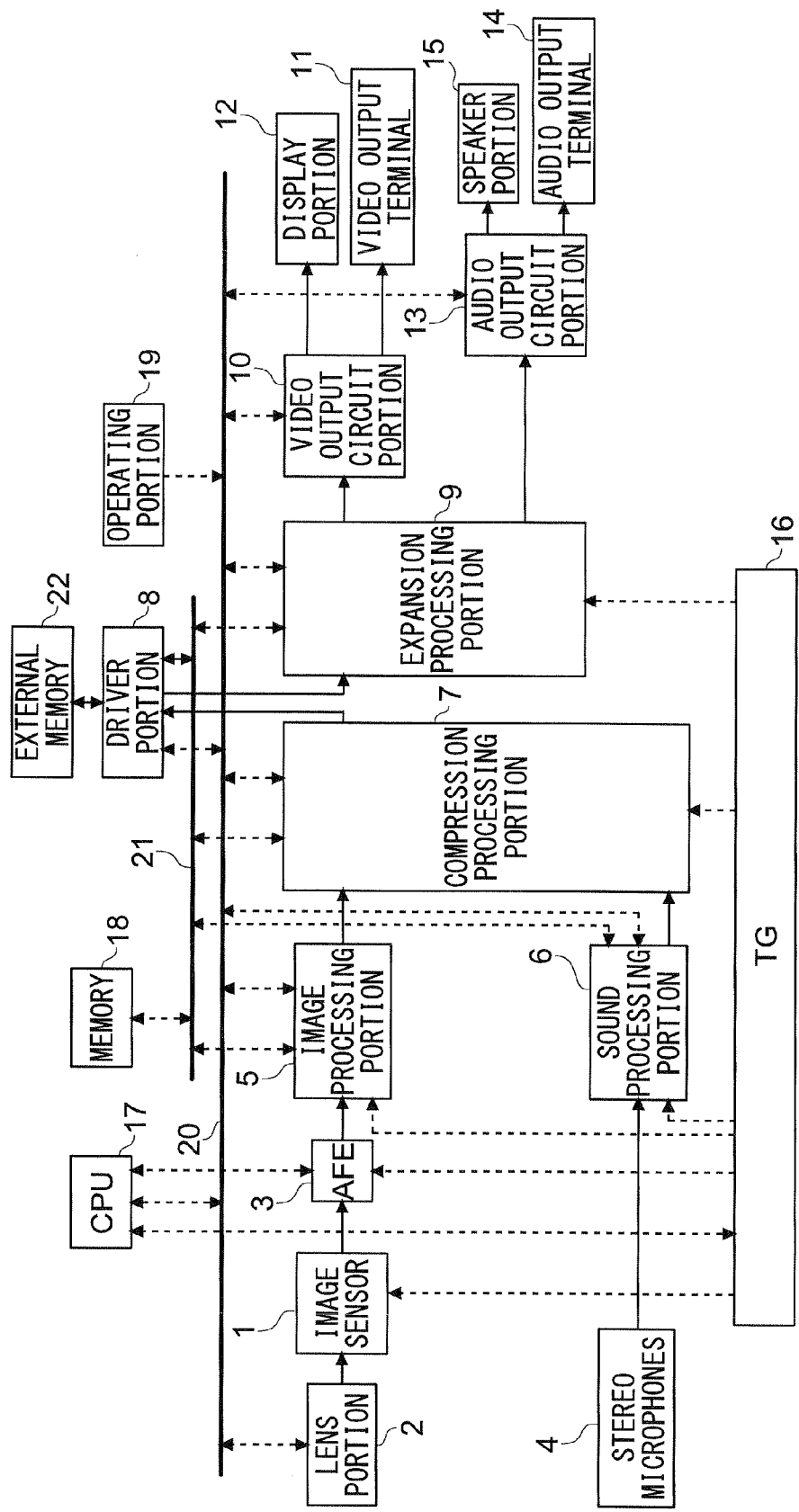
FIG. 1 is a block diagram showing an example of an internal structure of an electronic appliance (imaging apparatus) according to the present invention.

FIG. 1 is a block diagram showing an example of an internal structure of an electronic appliance (imaging apparatus) according to the present invention.

The imaging apparatus shown in FIG. 1 includes a solid-state imaging element (image sensor) 1 such as a CCD (Charge Coupled Device) or a CMOS (Complementary Metal Oxide Semiconductor) sensor for converting incident light into an electric signal, a lens portion 2 including a zoom lens for focusing an optical image of a subject on the image sensor 1 and a motor for changing a focal length of the zoom lens, i.e., an optical zoom magnification and a motor adjusting a focal point of the zoom lens to the subject, an analog front end (AFE) 3 for converting an image signal as an analog signal delivered from the image sensor 1 into an digital signal, stereo microphones 4 for converting sounds supplied from the left and the right direction in front of the imaging apparatus into electric signals independently, an image processing portion 5 for performing various types of image processing including gradation correction on the image signal to be the digital signal from the AFE 3, a sound processing portion 6 for converting the audio signal as the analog signal from the stereo microphones 4 into a digital signal and for performing a sound correction process thereon, a compression processing portion 7 for performing a compression coding process such as MPEG (Moving Picture Experts Group) compression method on the image signal from the image processing portion 5 and on the audio signal from the sound processing portion 6, a driver portion 8 for recording the compression coded signal that was compressed and coded by the compression processing portion 7 in an external memory 22 such as an SD card, a expansion processing portion 9 for expanding and decoding the compression coded signal read out from the external memory 22 by the driver portion 8, a video output circuit portion 10 for converting the image signal obtained by the decoding process in the expansion processing portion 9 into an analog signal, a video output terminal 11 for delivering the signal converted in the video output circuit portion 10, a display portion 12 including an LCD or the like for displaying images based on the signal from the video output circuit portion 10, an audio output circuit portion 13 for converting the audio signal from the expansion processing portion 9 into an analog signal, an audio output terminal 14 for delivering the signal converted in the audio output circuit portion 13, a speaker portion 15 for reproducing and delivering sounds based on the audio signal from the audio output circuit portion 13, a timing generator (TG) 16 for delivering a timing control signal for matching action timings of individual blocks with each other, a CPU (Central Processing Unit) 17 for controlling a general drive action of the imaging apparatus, a memory 18 for storing programs for the individual actions and for storing data temporarily when the program is executed, an operating portion 19 for a user to input instructions, a bus line 20 for sending and receiving data between the CPU 17 and each of the blocks, and a bus line 21 for sending and receiving data between the memory 18 and each of the blocks. Note that the CPU 17 drives the individual motors in the lens portion 2 in accordance with the image signal detected in the image processing portion 5 so as to perform focus control and iris control.

The sound processing portion 6 includes a sound collection environment deciding device according to the present invention, and an in-water characteristic correction device for performing characteristic correction suitable for an in-water environment on an audio signal of collected sound when sound collection environment deciding device according to the present invention decides that the sound collection was performed in water. From viewpoints of downsizing and cost reduction, it is desirable to make the single sound processing portion 6 or the sound processing portion 6 plus a sound compression coder in the compression processing portion 7 into a single LSI package.

Figure 2:
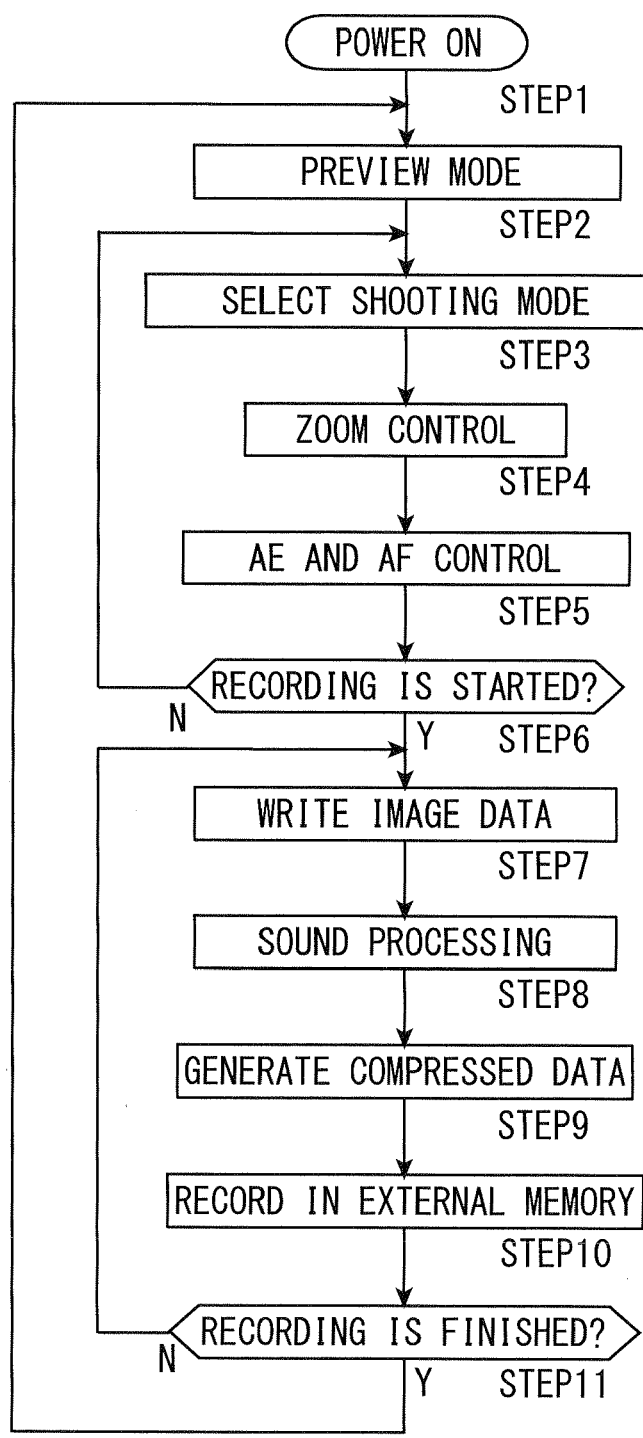
FIG. 2 is a flowchart for explaining a fundamental action of the imaging apparatus shown in FIG. 1 when a moving image is taken.

Next, a fundamental action of the imaging apparatus shown in FIG. 1 when it takes a moving image will be described with reference to the flowchart of FIG. 2. First, when the user operates the operating portion 19 so as to set the imaging apparatus to a mode for taking a moving image and turn on the power (STEP 1), a drive mode of the imaging apparatus, i.e., a drive mode of the image sensor 1 is set to a preview mode (STEP 2). Then, it becomes an input waiting state in a shooting mode. If the shooting mode is not entered, it is regarded that a normal shooting mode is selected (STEP 3). In the preview mode, the image signal as an analog signal obtained by a photoelectric conversion action of the image sensor 1 is converted into a digital signal by the AFE 3. Then, the image processing portion 5 perform the image processing thereon, and the image signal with respect to the current image compressed by the compression processing portion 7 is recorded temporarily in the external memory 22. This compressed signal is expanded by the expansion processing portion 9 via the driver portion 8, and the image having an angle of view corresponding to the zoom magnification of the lens portion 2 that is currently set is displayed on the display portion 12.

Next, when the user operates the operating portion 19 so that a desired angle of view is obtained for the subject to be shot, the zoom magnification is set the optical zoom corresponding to the operation (STEP 4). On this occasion, the CPU 17 controls the lens portion 2 based on the image signal supplied to the image processing portion 5, so as to perform optimal automatic exposure (AE) control and auto focus (AF) control (STEP 5).

After that, a record start button (that may be shared with a shutter button for shooting a still image) in the operating portion 19 is pressed fully so that start of recording action is instructed (Y in STEP 6). Then, the recording action is started, and the image signal as the analog signal obtained by the photoelectric conversion action in the image sensor 1 is sent to the AFE 3. On this occasion, the image sensor 1 is supplied with the timing control signal from the TG 16, and a horizontal scan and a vertical scan are performed so as to deliver the image signal to be data of each pixel. Then, the AFE 3 converts the image signal (raw data) as an analog signal into a digital signal, which is stored in a frame memory of the image processing portion 5 (STEP 7).

The image processing portion 5 performs various types of image processing such as a signal conversion process for generating a luminance signal and a color difference signal, and the image signal after the image processing is supplied to the compression processing portion 7. On the other hand, the sound processing portion 6 performs an A/D conversion process on the audio signal as an analog signal obtained by the stereo microphones 4 receiving sound input and decides whether the sound was collected in air or in water. If it is decided that the sound was collected in water, sound processing is performed on the audio signal of collected sound so that characteristic correction suitable for the in-water environment is performed. Then, the audio signal after the sound processing is supplied to the compression processing portion 7 (STEP 8). This sound processing will be described later.

The compression processing portion 7 performs compression coding on the digital signals as the image signal and the audio signal based on the MPEG compression coding method (STEP 9), and the result is supplied to the driver portion 8 and is stored in the external memory 22 (STEP 10). On this occasion, the compressed data stored in the external memory 22 is read out by the driver portion 8 and is supplied to the expansion processing portion 9, which performs an expanding process thereon so as to obtain the image signal. This image signal is supplied to the display portion 12, which displays the subject image that is currently obtained by the image sensor 1. After that, when the record start button of the operating portion 19 is pressed fully again so as to instruct to finish the recording action (Y in STEP 11), the process goes back to the preview mode (STEP 2).

When such the imaging action is performed, the TG 16 supplies the timing control signal to the AFE 3, the image processing portion 5, the sound processing portion 6, the compression processing portion 7 and the expansion processing portion 9, so that they can work in synchronization with the imaging action of the image sensor 1 for each frame.

In addition, when an instruction to reproduce the compressed moving image data stored in the external memory 22 is issued via the operating portion 19, the compressed moving image data stored in the external memory 22 is read out by the driver portion 8 and is supplied to the expansion processing portion 9. Then, the expansion processing portion 9 expands and decodes the data based on the MPEG compression coding method so that the image signal and the audio signal are obtained. Then, the image signal is supplied to the display portion 12 so that the image is reproduced, and the audio signal is supplied to the speaker portion 15 via the audio output circuit portion 13 so that the sound is reproduced. Thus, the image is reproduced together with the sound based on the compressed moving image data stored in the external memory 22.

<<Sound Collection Environment Deciding Device>>

Next, a concrete structural example of the sound processing portion 6 and an action thereof (STEP 8 in FIG. 2) will be described. First, examples of the sound collection environment deciding device that is provided to the sound processing portion 6 will be described.

<First Example of the Sound Collection Environment Deciding Device>

Figure 3:
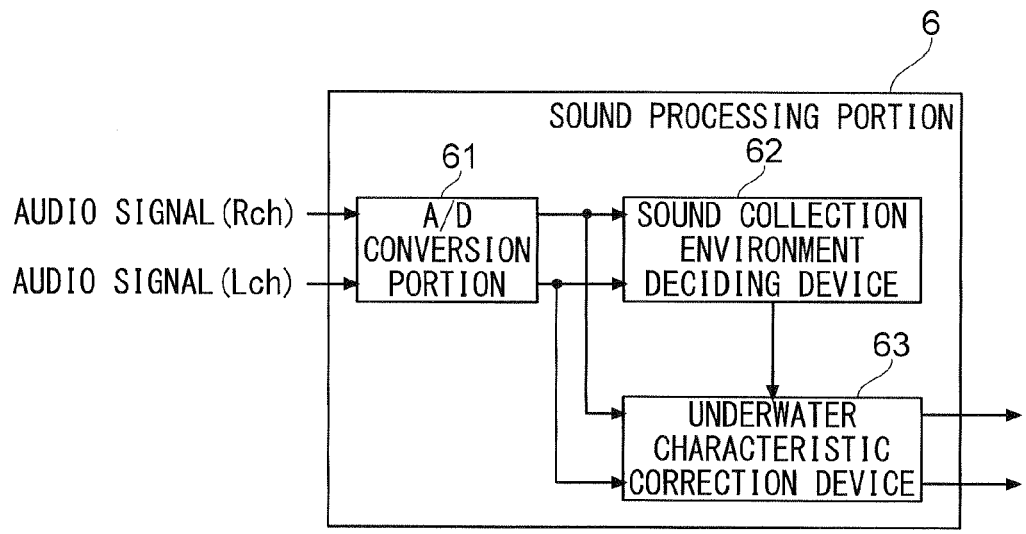
FIG. 3 is a block diagram showing a structure of a sound processing portion including the sound collection environment deciding device of the first example.

As shown in FIG. 3, the sound processing portion 6 includes an A/D conversion portion 61 for converting two audio signals (R channel and L channel) delivered from the stereo microphones 4 into individual digital signals, a sound collection environment deciding device 62 for deciding whether the sound was collected in air or in water based on the two audio signals delivered from the A/D conversion portion 61 and an in-water characteristic correction device 63 for performing characteristic correction suitable for the in-water environment on the audio signal of collected sound if the sound collection environment deciding device 62 decides that the sound was collected in water.

Figure 4:
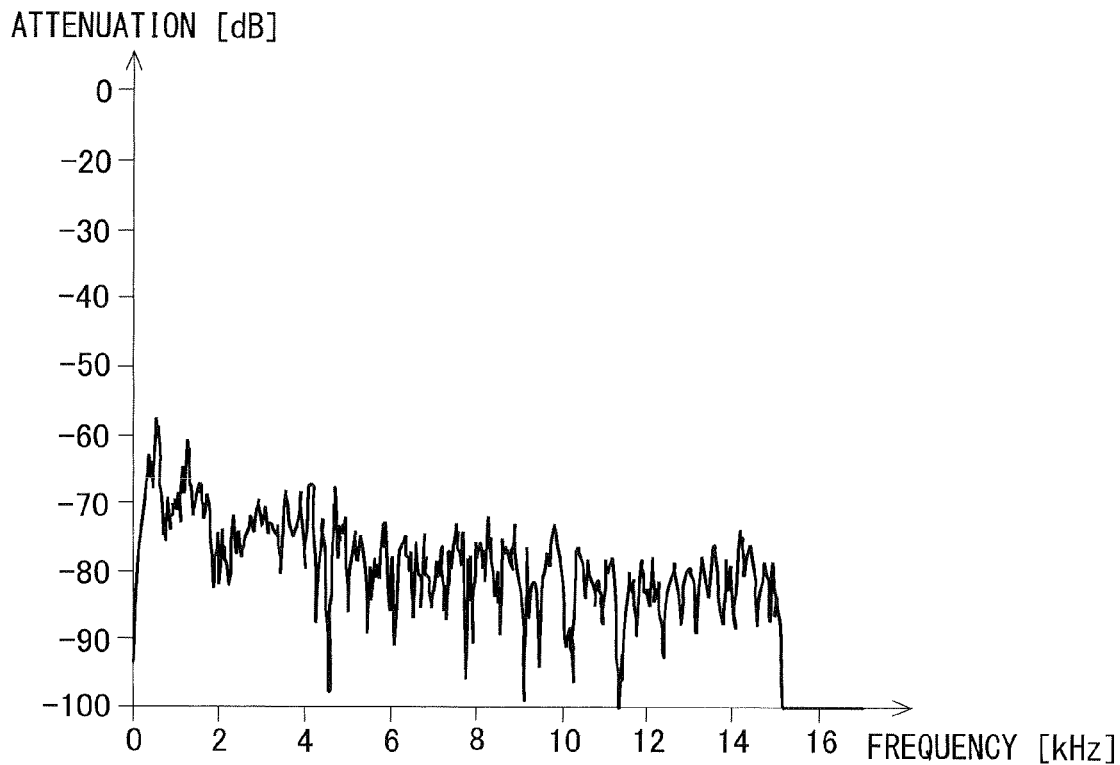
FIG. 4 is a diagram showing frequency characteristics of sounds in air.
Figure 5:
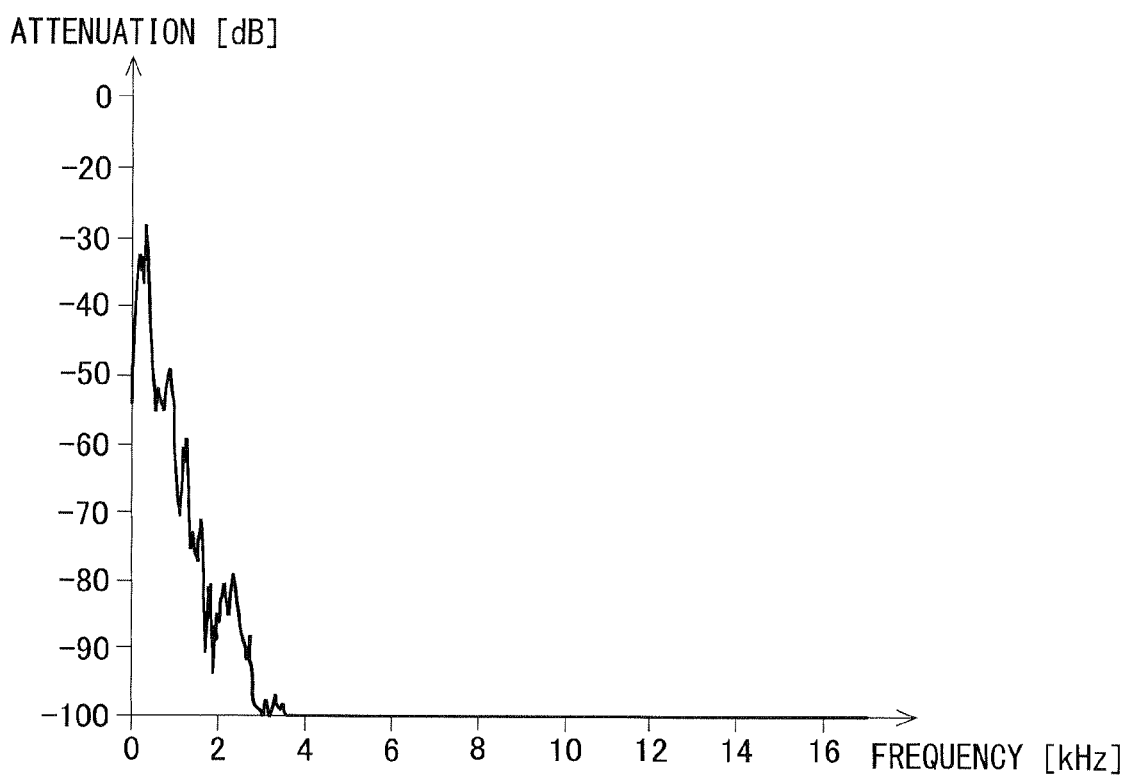
FIG. 5 is a diagram showing frequency characteristics of sounds in water.

As understood apparently from comparison between the sound frequency characteristics of sound collected in air shown in FIG. 4 and the sound frequency characteristics of sound collected in water shown in FIG. 5, the frequency characteristics of the audio signal in water have larger attenuation in the high frequency band so that power is concentrated in the low frequency band compared with the frequency characteristics in air. Therefore, the sound collection environment deciding device 62 of this example utilizes the difference of frequency characteristics of the audio signal between in air and in water for deciding whether the sound was collected in air or in water.

Hereinafter, an example of the deciding method performed by the sound collection environment deciding device 62 will be described. With respect to the two audio signals delivered from the A/D conversion portion 61, an average value of signal levels is calculated for each band of the low frequency band (e.g., several tens (70) Hz to 3 kHz), the medium frequency band (e.g., 6 kHz to 9 kHz) and the high frequency band (e.g., 12 kHz to 15 kHz). Note that the concrete values of the bands are not limited to the above-mentioned example, but it is sufficient if the order relationship among values of the bands is correct. In addition, the low frequency band and the medium frequency band may overlap each other, and similarly, the medium frequency band and the high frequency band may overlap each other.

Figure 6:
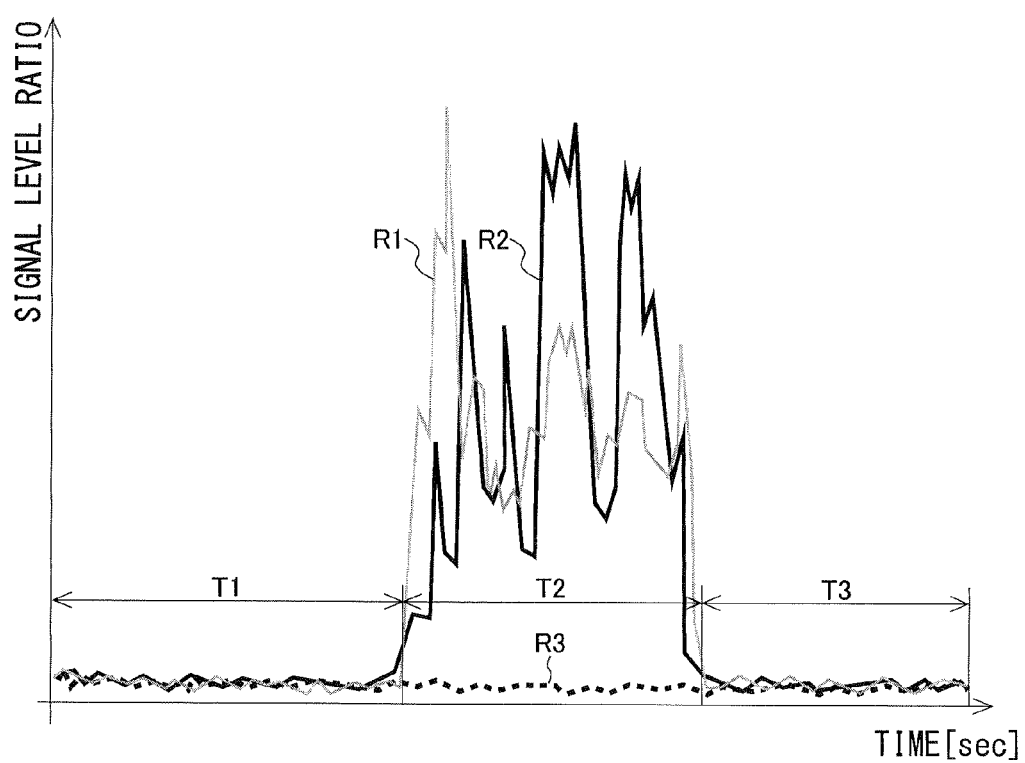
FIG. 6 is a diagram showing a difference between sound frequency characteristics in air and the same in water.

A signal level ratio of the low frequency band to the high frequency band, i.e., (low frequency band)/(high frequency band) R1, a signal level ratio of the low frequency band to the medium frequency band, i.e., (low frequency band)/(medium frequency band) R2 and a signal level ratio of the medium frequency band to the high frequency band, i.e., (medium frequency band)/(high frequency band) R3, which can be calculated from the average values of signal levels in the frequency bands, show time variations as shown in FIG. 6 when the stereo microphones 4 is displaced from in-air to in-water and is displaced again to in-air. The time periods T1 and T3 in FIG. 6 are a period while the stereo microphones 4 is placed in air, and the time period T2 in FIG. 6 is a period while the stereo microphones 4 is placed in water. The signal level ratio of the medium frequency band to the high frequency band, i.e., (medium frequency band)/(high frequency band) R3 is substantially constant regardless of in-air or in-water. In contrast, the signal level ratio of the low frequency band to the high frequency band, i.e., (low frequency band)/(high frequency band) R1 and the signal level ratio of the low frequency band to the medium frequency band, i.e., (low frequency band)/(medium frequency band) R2 are small values in air, but they become substantially large values in water compared with the case of in-air since the sound collection sensitivity varies.

Utilizing this fact, the sound collection environment deciding device 62 calculates the signal level ratio of the low frequency band to the high frequency band, i.e., (low frequency band)/(high frequency band) R1 and the signal level ratio of the low frequency band to the medium frequency band, i.e., (low frequency band)/(medium frequency band) R2 from the average values of signal levels in the respective frequency bands. If the signal level ratio of the low frequency band to the high frequency band, i.e., (low frequency band)/(high frequency band) R1 and the signal level ratio of the low frequency band to the medium frequency band, i.e., (low frequency band)/(medium frequency band) R2 become larger than threshold values, the sound collection environment deciding device 62 decides that the sound collection environment is in-water. Although accuracy of decision may be lowered, it is possible to decide that the sound collection environment is in-water if the signal level ratio of the low frequency band to the high frequency band, i.e., (low frequency band)/(high frequency band) R1 becomes larger than a threshold value without calculating the average value of signal levels in the medium frequency band and the signal level ratio of the low frequency band to the medium frequency band, i.e., (low frequency band)/(medium frequency band) R2. It is also possible to decide that the sound collection environment is in-water if the signal level ratio of the low frequency band to the medium frequency band, i.e., (low frequency band)/(medium frequency band) R2 is larger than a threshold value without calculating the average value of signal levels in the high frequency band and the signal level ratio of the low frequency band to the high frequency band, i.e., (low frequency band)/(high frequency band) R1.

Note that also in water burst noise may be generated due to sounds of bubbles and rubbing sound of the casing, which causes an instantaneous increase of the signal level in the medium frequency band and the high frequency band, so that the signal level ratio of the low frequency band to the high frequency band, i.e., (low frequency band)/(high frequency band) R1 and the signal level ratio of the low frequency band to the medium frequency band, i.e., (low frequency band)/(medium frequency band) R2 could become very small values instantaneously. Therefore, it is desirable that the signal level ratio of the low frequency band to the high frequency band, i.e., (low frequency band)/(high frequency band) R1 and the signal level ratio of the low frequency band to the medium frequency band, i.e., (low frequency band)/(medium frequency band) R2 used by the sound collection environment deciding device 62 for the decision should be average values of a predetermined time period.

In addition, it is desirable that the threshold value should have a hysteresis characteristic so that the threshold value is set to a high value while it is decided to be in air and that the threshold value is set to a low value while it is decided to be in water.

When the sound collection environment deciding device 62 decides that the sound was collected in water, the in-water characteristic correction device 63 performs characteristic correction suitable for the in-water environment on the audio signal of collected sound. When the sound collection environment deciding device 62 decides that the sound was collected in air, it performs a through process.

For instance, a suppression of gain and correction of frequency characteristics are performed as the characteristic correction suitable for the in-water environment. Since the sound collection sensitivity with respect to noise increases in water, the suppression of gain of the audio signal will be the characteristic correction suitable for the in-water environment. In addition, the correction (amplification) of frequency characteristics performed for the high frequency band with large attenuation quantity by using a variable filter or the like will be the characteristic correction suitable for the in-water environment. Note that details of the in-water characteristic correction device will be described later.

According to this sound processing, the sound collection environment is decided by utilizing the audio signal of collected sound. Therefore, the sound collection environment decision can be performed without a special operation for the sound collection environment decision or a special component for the sound collection environment decision. In addition, since there is a large difference between the frequency characteristics of the audio signal in air and the same in water, high accuracy of decision can be expected. Thus, it can be expected to prevent the characteristic correction suitable for the in-water environment from being performed on the audio signal of sound collected in air due to incorrect decision. Since the characteristic correction suitable for the in-water environment is performed on the audio signal of sound collected in water, it is possible to obtain sound information suitable for the in-water environment. The sound information suitable for the in-water environment can be compressed in the compression processing portion 7 and can be stored in the external memory 22.

<Second Example of the Sound Collection Environment Deciding Device>

Figure 7:
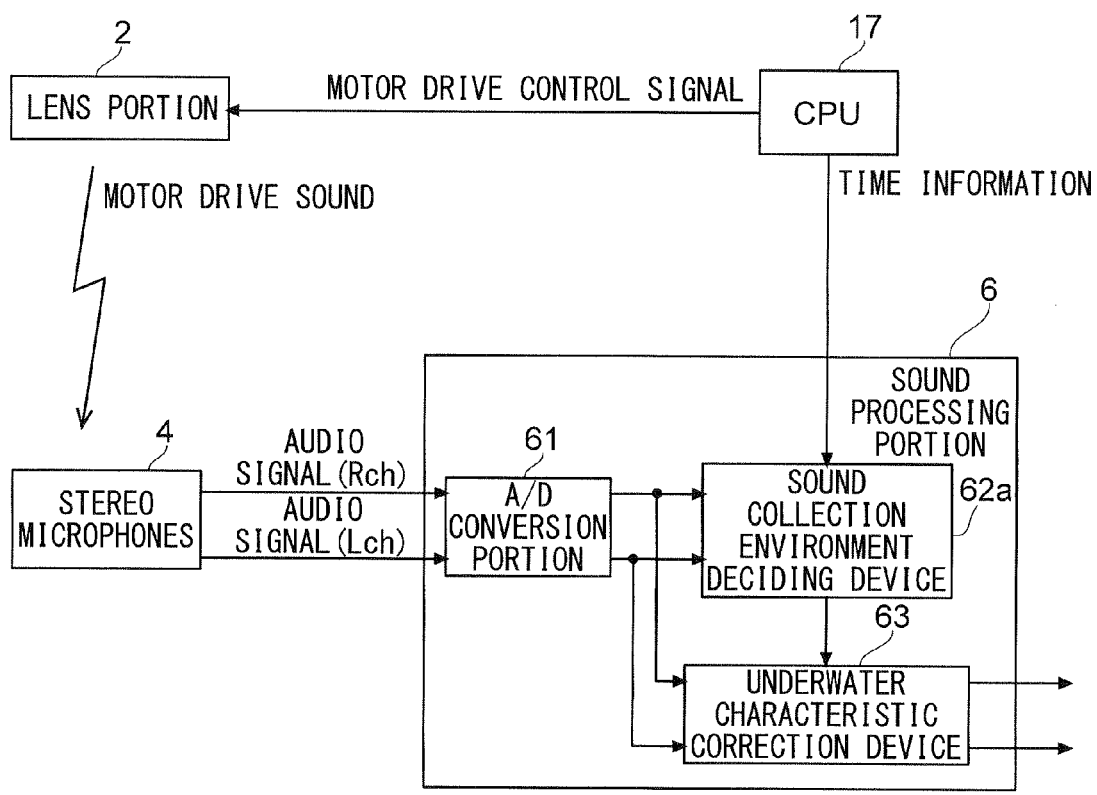
FIG. 7 is a block diagram showing a structure of a sound processing portion including a sound collection environment deciding device according to a second example.

As shown in FIG. 7, the sound processing portion 6 includes the A/D conversion portion 61 for converting the two audio signals (R channel and L channel) delivered from the stereo microphones 4 respectively into digital signals, a sound collection environment deciding device 62a for deciding whether the sound was collected in air or in water based on the two audio signals delivered from the A/D conversion portion 61 and time information delivered from the CPU 17 and the in-water characteristic correction device 63 for performing the characteristic correction suitable for the in-water environment on the audio signal of collected sound in the case where the sound collection environment deciding device 62a decides that the sound was collected in water.

It is known as propagation characteristics of the audio signal in water that the propagation speed thereof is substantially different from the same in air. In general, the propagation speed of sound is said to be 344 m/s in air and is 1500 m/s in water. Therefore, the sound collection environment deciding device 62a of this example utilizes the difference between the propagation characteristics of the audio signal in air and the same in water, so as to decide whether the sound was collected in air or in water.

In order measure the propagation speed of sound in the sound collection environment deciding device 62a, the drive sound of the imaging apparatus shown in FIG. 1 is used. Here, as an example of the drive sound of the imaging apparatus shown in FIG. 1, drive sound of the motor for changing the optical zoom magnification in the lens portion 2 is used. The CPU 17, which controls the drive of the motor for changing the optical zoom magnification in the lens portion 2 in accordance with an output of the operating portion 19, performs time management concerning the drive timing of the motor for changing the optical zoom magnification in the lens portion 2 and delivers the information to the sound collection environment deciding device 62a. The drive sound of the motor for changing the optical zoom magnification in the lens portion 2 is collected by the stereo microphones 4 as the drive sound of the imaging apparatus shown in FIG. 1 (self-generating drive sound). Then, the sound collection environment deciding device 62a measures the propagation speed of the self-generating drive sound based on the time information concerning the drive timing of the motor for changing the optical zoom magnification in the lens portion 2 supplied from the CPU 17 and the sound collection time of the self-generating drive sound collected by the stereo microphones 4 (drive sound of the motor for changing the optical zoom magnification in the lens portion 2). In the imaging apparatus shown in FIG. 1, since the propagation speed of the self-generating drive sound in air can be obtained in advance, it is possible to decide whether the sound was collected in air or in water.

Note that details of the in-water characteristic correction device 63 will be described later.

According to this sound processing, similarly to the decision process in the first example, the audio signal of collected sound is utilized for performing the sound collection environment decision. Therefore, the sound collection environment decision can be performed without a special operation for the sound collection environment decision or a special component for the sound collection environment decision. Since the characteristic correction suitable for the in-water environment is performed on the audio signal of sound collected in water, it is possible to obtain sound information suitable for the in-water environment. The sound information suitable for the in-water environment can be compressed in the compression processing portion 7 and can be stored in the external memory 22. In addition, since the occurrence time of the self-generating drive sound is managed by the CPU 17 so that the information is supplied to the sound processing portion 6, it is possible to adopt another structure in which the sound processing portion 6 reduces the self generating drive sound noise by using the information with a noise elimination filter or the like.

<Third Example of the Sound Collection Environment Deciding Device>

Figure 8:
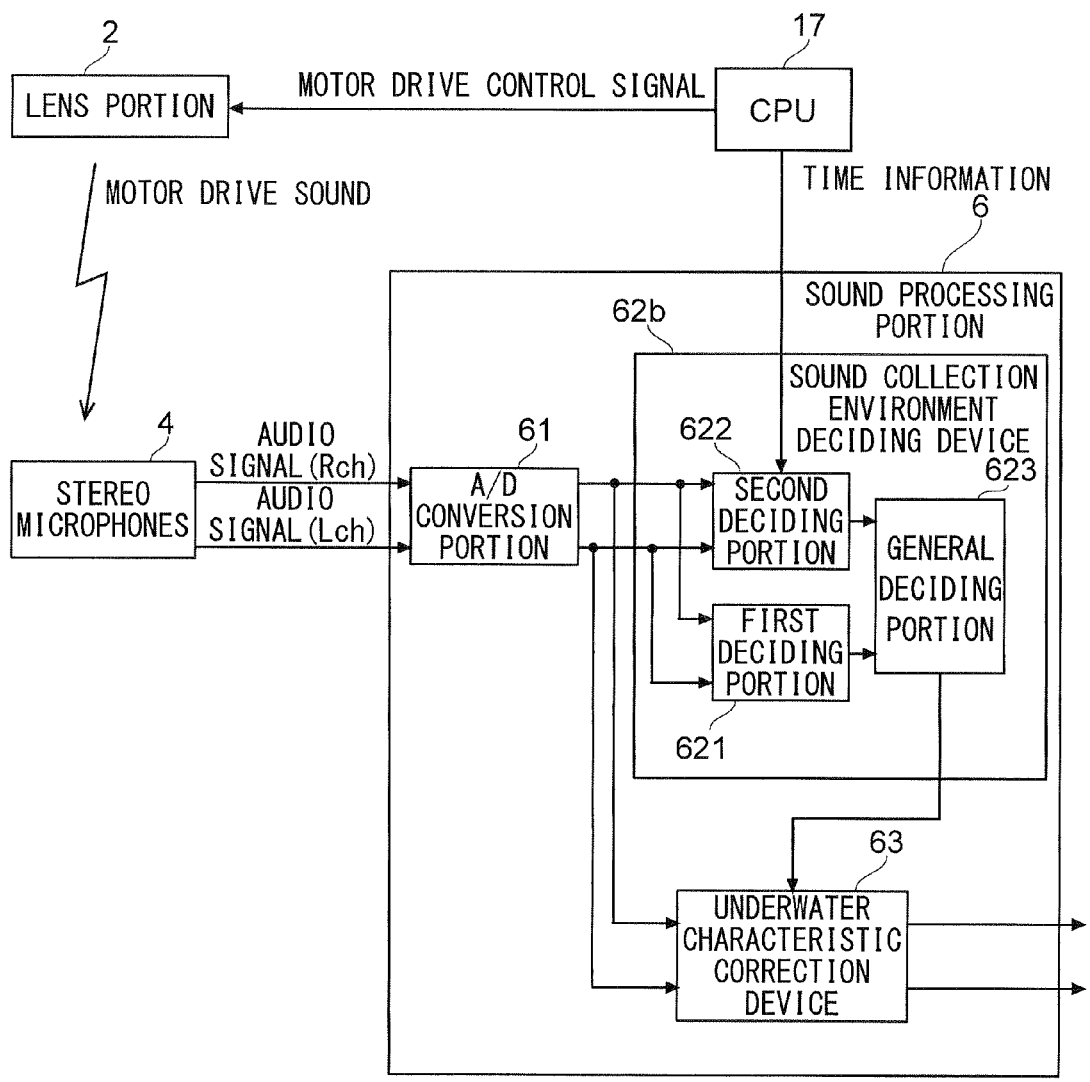
FIG. 8 is a block diagram showing a structure of a sound processing portion including a sound collection environment deciding device according to a third example.

As shown in FIG. 8, the sound processing portion 6 includes the A/D conversion portion 61 for converting the two audio signals (R channel and L channel) delivered from the stereo microphones 4 respectively into digital signals, a sound collection environment deciding device 62b for deciding whether the sound was collected in air or in water based on the two audio signals delivered from the A/D conversion portion 61 and time information delivered from the CPU 17 and the in-water characteristic correction device 63 for performing the characteristic correction suitable for the in-water environment on the audio signal of collected sound if the sound collection environment deciding device 62b decides that the sound was collected in water.

The sound collection environment deciding device 62b of this example is a deciding device for deciding whether the sound was collected in air or in water based on a combination of a difference between the frequency characteristics of the audio signal in air and the same in water and a difference between the propagation characteristics. The sound collection environment deciding device 62b includes a first deciding portion 621 for deciding whether the sound was collected in air or in water by utilizing a difference between the frequency characteristics of the audio signal in air and the same in water, a second deciding portion 622 for deciding whether the sound was collected in air or in water by utilizing a difference between the propagation characteristics of the audio signal in air and the same in water and a general deciding portion 623 for providing the in-water characteristic correction device 63 with a decision result that the sound was collected in water if both the first deciding portion 621 and the second deciding portion 622 decided that the sound was collected in water.

The decision performed by the second deciding portion 622 using the difference between the propagation characteristics of the audio signal in air and the same in water can utilize the propagation speed of the drive sound of the imaging apparatus shown in FIG. 1 similarly to the second embodiment. However, it can also utilize others, for instance, a phase difference caused by a difference of arrival time between the stereo microphones 4.

Figure 9:
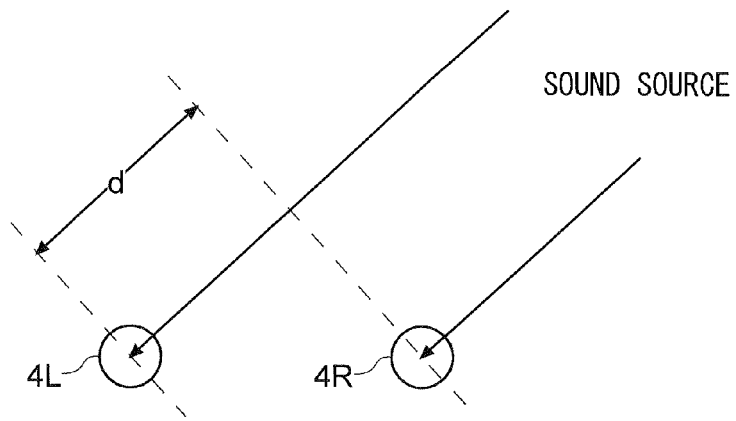
FIG. 9 is a schematic diagram for explaining a positional relationship between a microphone and a sound source.

As shown in FIG. 9, if sound comes from a specific direction to the two microphones 4R and 4L constituting the stereo microphones 4, the arrival time of the sound may be different between the microphones 4R and 4L in accordance with a path difference d between path lengths to the microphones 4R and 4L. The difference of arrival time between the stereo microphones 4 can be obtained by dividing the path difference d by the propagation speed of sound. In general, the propagation speed of sound is said to be 344 r/s in air and is 1500 m/s in water. Therefore, the phase difference due to the difference of arrival time between the stereo microphones 4 in air is different from the phase difference due to the difference of arrival time between the stereo microphones 4 in water. It is possible to utilize this difference between the phase differences for deciding whether the sound was collected in air or in water. In this case, the CPU 17 is not required to supply the time information to the second deciding portion 622. In addition, instead of using the stereo microphones, a microphone array (e.g., microphones supporting 5.1 channel surround recording) other than the stereo microphones may be used for performing the sound collection environment decision utilizing the phase difference due to the difference of arrival time between the microphone arrays.

Note that details of the in-water characteristic correction device 63 will be described later.

According to this sound processing, similarly to the decision process in the first example, the audio signal of collected sound is utilized for performing the sound collection environment decision. Therefore, the sound collection environment decision can be performed without a special operation for the sound collection environment decision or a special component for the sound collection environment decision. Then, since the characteristic correction suitable for the in-water environment is performed on the audio signal of sound collected in water, sound information suitable for the in-water environment can be obtained. The sound information suitable for the in-water environment can be compressed in the compression processing portion 7 so as to be stored in the external memory 22.

<Variations of the Sound Collection Environment Deciding Device>

Note that the combination of the sound collection environment decision methods in the sound collection environment deciding device 62b is not limited to the above-mentioned combination of the sound collection environment decision utilizing the difference of the frequency characteristics of the audio signal and the sound collection environment decision utilizing the difference of the propagation characteristics of the audio signal. Other combinations can be adopted, which includes a combination of the sound collection environment decision utilizing the difference of the frequency characteristics of the audio signal or the sound collection environment decision utilizing the difference of the propagation characteristics of the audio signal with the other sound collection environment decision utilizing the audio signal of collected sound, and a combination of other types of sound collection environment decisions utilizing the audio signal of collected sound. In addition, it is also possible to adopt a combination of the sound collection environment decision utilizing the audio signal of collected sound and the sound collection environment decision without utilizing the audio signal of collected sound (e.g., the sound collection environment decision utilizing the pressure sensor as described above as the conventional technique). The electronic appliance, which adopts the combination of the sound collection environment decision utilizing the audio signal of collected sound and the sound collection environment decision without utilizing the audio signal of collected sound, may not be as good as the electronic appliance adopting the combination of only the sound collection environment decisions utilizing the audio signal of collected sound without using any special component for the imaging environment decision, but it can realize downsizing and cost reduction more than the electronic appliance adopting a combination of the conventional sound collection environment decision using a special component for the imaging environment decision (e.g., the sound collection environment decision utilizing the conventional pressure sensor) and the conventional sound collection environment decision using the special component for the imaging environment decision (that uses in-water deciding means including the sound collection environment decision utilizing the conventional light projecting means and the light receiving means, for instance). Therefore, the electronic appliance adopting the combination of the sound collection environment decision utilizing the audio signal of collected sound and the sound collection environment decision without utilizing the audio signal of collected sound is also included in the present invention.

In addition, since a plurality of sound collection environment decision methods are combined, higher accuracy of decision can be expected. Thus, it can be further expected to prevent the characteristic correction suitable for the in-water environment from being performed on the audio signal of sound collected in air due to incorrect decision.

Next, display by the display portion 12 concerning the sound collection environment decision will be described.

The imaging apparatus shown in FIG. 1 may have the following structure. A result of the sound collection environment decision performed by the sound collection environment deciding device in the sound processing portion 6 may be supplied to the CPU 17. If a result of the sound collection environment decision performed by the sound collection environment deciding device in the sound processing portion 6 shows that the sound was collected in water, the CPU 17 may control the video output circuit portion 10 to superimpose character information such as "in-water shooting mode" or "in-water recording time" on the image signal obtained by decoding in the expansion processing portion 9.

In addition, the imaging apparatus shown in FIG. 1 may display a warning for the user if a result of the sound collection environment decision is not changed appropriately due to the change in environment when the sound collection environment changes from in-water to in-air.

Figure 10:
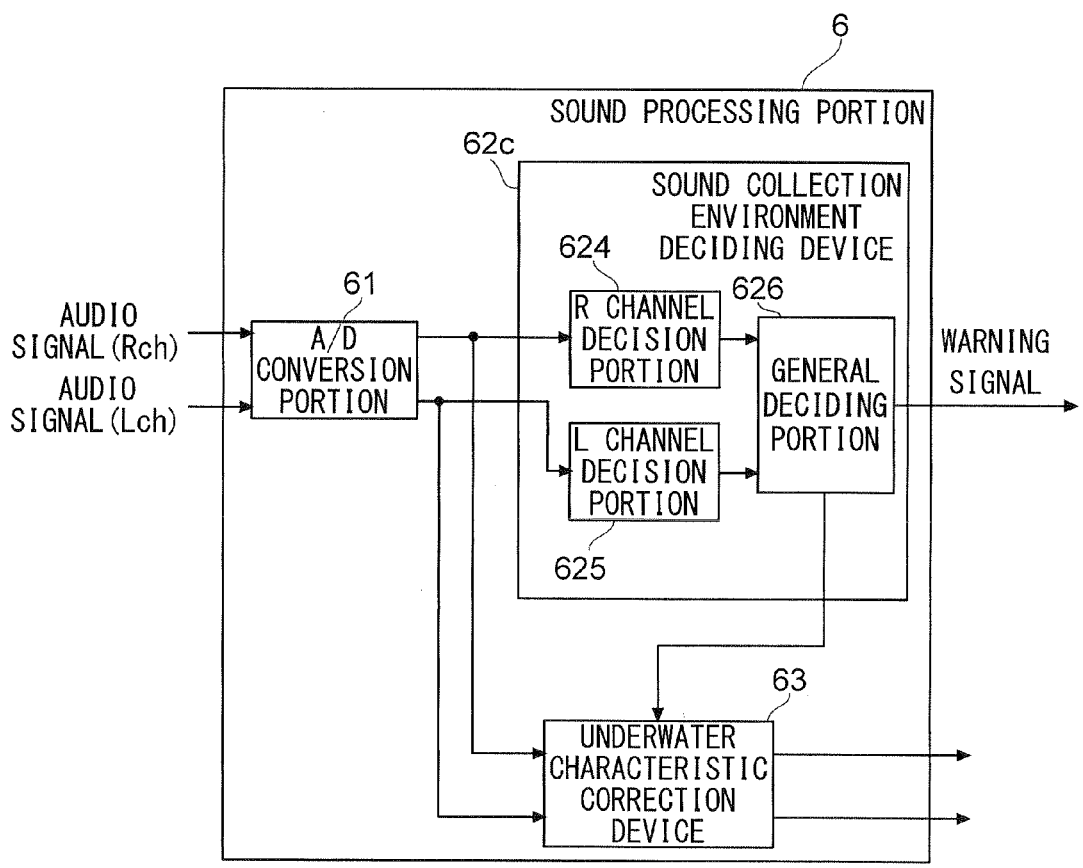
FIG. 10 is a block diagram showing a variation of the sound processing portion.

For instance, the sound processing portion 6 shown in FIG. 3 may be modified as shown in FIG. 10, so as to detect the case where a result of the sound collection environment decision is not changed appropriately due to the change in environment when the sound collection environment changes from in-water to in-air.

A sound collection environment deciding device 62c includes an R channel deciding portion 624 for deciding whether the sound was collected in air or in water utilizing a difference between the frequency characteristics of the audio signal of the right channel (R channel) in air and the same in water, an L channel deciding portion 625 for deciding whether the sound was collected in air or in water utilizing a difference between the frequency characteristics of the audio signal of the left channel (L channel) in air and the same in water, and a general deciding portion 626 for supplying the in-water characteristic correction device 63 with a decision result that the sound was collected in water if both the R channel deciding portion 624 and the L channel deciding portion 625 decide that the sound was collected in water.

If the decision result of the R channel deciding portion 624 and the decision result of the L channel deciding portion 625 do not match each other, the general deciding portion 626 delivers a warning signal to the CPU 17. When the CPU 17 receives the warning signal from the general deciding portion 626, it controls the video output circuit portion 10 to superimpose character information such as "sound collection environment decision error" on the image signal obtained by decoding in the expansion processing portion 9. Thus, if the decision result of the R channel deciding portion 624 and the decision result of the L channel deciding portion 625 do not match each other, the display portion 12 can display a warning. For instance, when the sound collection environment changes from in-water to in-air, and if only one of the R channel microphone and the L channel microphone of the stereo microphones 4 is insufficiently dried, the decision result of the R channel deciding portion 624 and the decision result of the L channel deciding portion 625 may not match each other. Note that a microphone array (e.g., microphones supporting 5.1 channel surround recording) other than the stereo microphones may be used instead of using the stereo microphones, so that the same warning display can be performed.

Since the display portion 12 performs the above-mentioned display concerning the sound collection environment decision, it is possible to show the user that the sound collection environment decision is performed appropriately and to provide the user with effective information related to the sound collection environment decision. Note that it is possible to show the user explicitly the information related to the sound collection environment decision by means other than the display with the display portion 12. For instance, it is possible to dispose an LED for displaying the "in-water shooting mode" that lights up in the "in-water shooting mode" and a warning LED that lights up if the decision result of the R channel deciding portion 624 and the decision result of the L channel deciding portion 625 do not match each other, so as to show the user explicitly the information related to the sound collection environment decision.

In addition, it is possible to perform a monophonic signal correction process instead of or in addition to the warning display as described above if the decision result of the R channel deciding portion 624 and the decision result of the L channel deciding portion 625 do not match each other.

Figure 11:
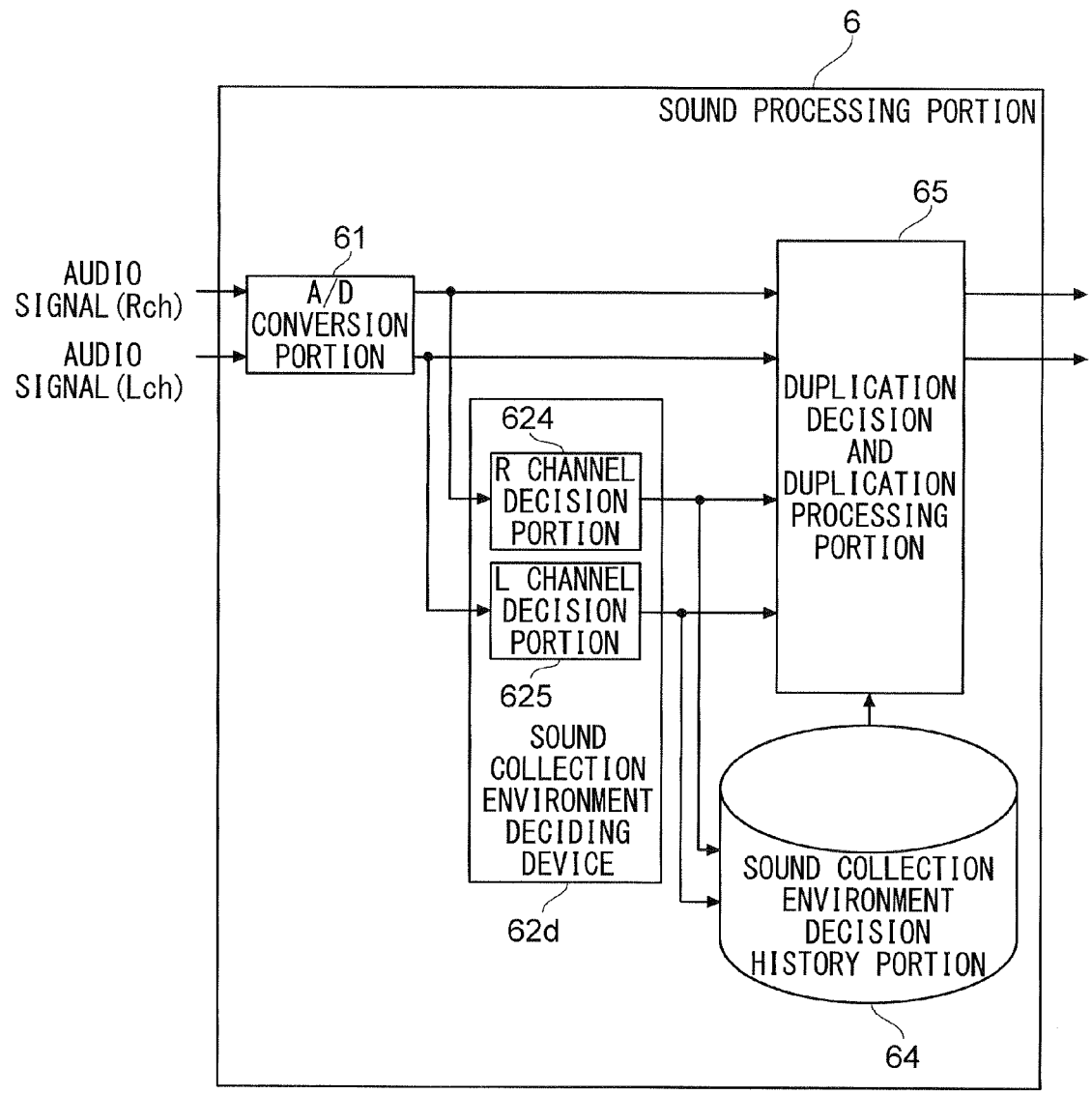
FIG. 11 is a block diagram showing another variation of the sound processing portion.

Here, an example will be described, in which a monophonic signal correction process is performed instead of the warning display as described above if the decision result of the R channel deciding portion 624 and the decision result of the L channel deciding portion 625 do not match each other. In this example, the sound processing portion 6 of the first embodiment is deformed as shown in FIG. 11.

A sound collection environment deciding device 62d includes an R channel deciding portion 624 for deciding whether the sound was collected in air or in water utilizing a difference between the frequency characteristics of the audio signal of the right channel (R channel) in air and the same in water and an L channel deciding portion 625 for deciding whether the sound was collected in air or in water utilizing a difference between the frequency characteristics of the audio signal of the left channel (L channel) in air and the same in water.

A sound collection environment decision history portion 64 stores the decision result of the R channel deciding portion 624 and the decision result of the L channel deciding portion 625 as a pair.

When the R channel deciding portion 624 and the L channel deciding portion 625 perform the sound collection environment decision process on the stereo signal consisting of the audio signal of the right channel (R channel) and the audio signal of the left channel (L channel), a result of the process may be the case where the deciding portion of one of the channels decides to be in water while the deciding portion of the other channel decides not to be in water. For instance, there may be the case where the imaging apparatus shown in FIG. 1 is taken out from water into air, but the only one of the R channel microphone and the L channel microphone of the stereo microphones 4 is insufficiently dried, or the case where the shooting is performed in shallow water so that only one of the R channel microphone and the L channel microphone of the stereo microphones 4 is out of the water. In this case, collected sounds have different frequency characteristics between the R channel and the L channel, so there will be incongruity if they are recorded and reproduced as they are.

Therefore, if the deciding portion of one of the channels decides to be in water while the deciding portion of the other channel decides not to be in water when the R channel deciding portion 624 and the L channel deciding portion 625 perform the sound collection environment decision process on the stereo signal consisting of the audio signal of the right channel (R channel) and the audio signal of the left channel (L channel), a duplication decision and duplication processing portion 65 duplicates a signal of either one of the channels to the other channel so as to correct as a monophonic signal, which is used as the output signal of the sound processing portion 6.

The signal of which channel to be duplicated is decided by referring to the result of the sound collection environment decision in the past stored in the sound collection environment decision history portion 64. For instance, if the decision results of both channels were in water for a few seconds in the past, there is a high probability that it is continuously in water. Therefore, the audio signal of the channel that is decided to be in water is duplicated to the other channel (that is decided not to be in water). In addition, not only the decision results in the past but also decision results thereafter may be referred to, so that it is possible to know a situation whether or not the apparatus is moved between in-water and in-air. Note that it is desirable that the duplication decision and duplication processing portion 65 has an in-water characteristic correction function for performing characteristic correction suitable for the in-water environment on the audio signal of collected sound if both the R channel deciding portion 624 and the L channel deciding portion 625 decided to be in water. In this case, the duplication decision and duplication processing portion 65 can be regarded to be the in-water characteristic correction device.

<<In-Water Characteristic Correction Device>>

Next, each example of the in-water characteristic correction device 63 will be described with reference to the drawings. Although the audio signals of sounds that are collected by the stereo microphones 4 are referred to as one audio signal without discriminating their channels for a simple description, it is possible that the in-water characteristic correction device 63 performs the in-water characteristic correction process for each of the channels.

<First Example of the In-Water Characteristic Correction Device>

Figure 12:
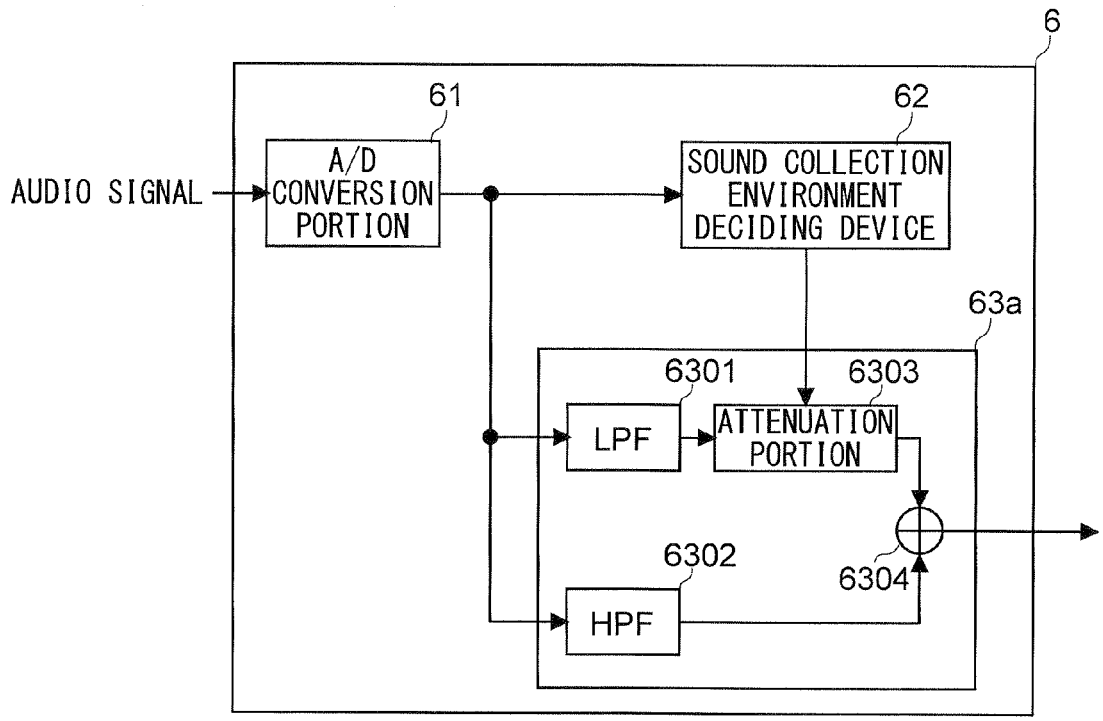
FIG. 12 is a block diagram showing a structure of a sound processing portion including an in-water characteristic correction device of a first example.

First, a first example of the in-water characteristic correction device will be described with reference to the drawings. FIG. 12 is a block diagram showing a structure of a sound processing portion equipped with the in-water characteristic correction device of the first example. As shown in FIG. 12, the sound processing portion 6 includes the A/D conversion portion 61, the sound collection environment deciding device 62 and an in-water characteristic correction device 63a.

In addition, the in-water characteristic correction device 63a includes a LPF (Low Pass Filter) 6301 for extracting and delivering a low frequency band component below a predetermined frequency in the input audio signal, an HPF (High Pass Filter) 6302 for extracting and delivering a high frequency band component above a predetermined frequency in the input audio signal, an attenuation portion 6303 for attenuating the low frequency band component delivered from the LPF 6301 based on the decision result of the sound collection environment deciding device 62 and a combining portion 6304 for combining the low frequency band component delivered from the attenuation portion 6303 and the high frequency band component delivered from the HPF 6302 so as to deliver the result audio signal.

The sound collection environment deciding device 62 decides whether or not the sound of the input audio signal was collected in water by the method described above. On the other hand, as for the in-water characteristic correction device 63a, the LPF 6301 extracts the low frequency band component of the input audio signal, and the HPF 6302 extracts the high frequency band component of the input audio signal. If the sound collection environment deciding device 62 decides that the sound of the input audio signal was collected in water, the attenuation portion 6303 attenuates the low frequency band component delivered from the LPF 6301. If the sound collection environment deciding device 62 decides that the sound of the input audio signal was not collected in water, the attenuation portion 6303 delivers the low frequency band component without attenuating the same. Then, the combining portion 6304 combines the low frequency band component and the high frequency band component so as to deliver the result audio signal.

As shown in FIGS. 4 and 5, the frequency characteristics of the audio signal of sound collected in air and the frequency characteristics of the audio signal of sound collected in water do not match each other. In particular, the audio signal of sound collected in water has intensity concentrated in the low frequency band more than the audio signal of sound collected in air has. Therefore, the reproduced sound may be very hard to listen or may be a grating sound, so that it becomes far from the audio signal of the user's intention.

However, if the in-water characteristic correction device 63a is configured as shown in this example, the low frequency band component of the audio signal of sound collected in water can be attenuated. Therefore, the influence of the sound collection characteristics in water can be reduced from the audio signal of sound collected in water. In other words, it is possible to make the signal effectively be close to the audio signal of the user's intention.

Note that the cutoff frequency of the LPF 6301 and the HPF 6302 may be a certain frequency $\lambda_1$. In addition, the frequency $\lambda_1$ may be 2 kHz, for instance. In addition, the attenuation quantity of gain of the attenuation portion 6303 may be 20 dB, for instance.

Although the LPF 6301 and the HPF 6302 are used for attenuating all the components below the frequency $\lambda_1$ in this example, it is possible to adopt another structure in which components in a predetermined frequency band are attenuated. In order to realize this structure, for instance, the LPF 6301 may be replaced with a BPF (Band Pass Filter) that passes a frequency component of a band between the upper limit frequency $\lambda_1$ and the lower limit frequency $\lambda_a$, and the frequency component after passing through this BPF is attenuated by the attenuation portion 6303. Further, in this case, for instance, the HPF 6302 may be replaced with a BEF (Band Elimination Filter) for passing a frequency component above the frequency $\lambda_1$ and a frequency component below the frequency $\lambda_a$.

<Second Example of the In-Water Characteristic Correction Device>

Figure 13:
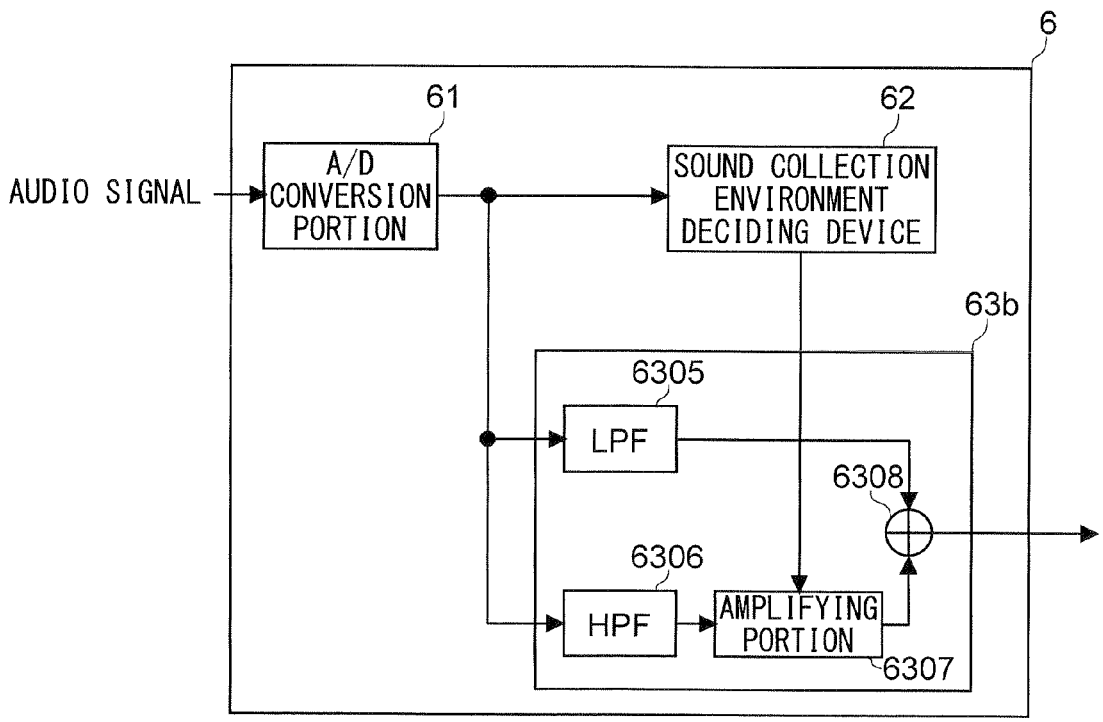
FIG. 13 is a block diagram showing a structure of a sound processing portion including an in-water characteristic correction device of a second example.

Next, a second example of the in-water characteristic correction device will be described with reference to the drawings. FIG. 13 is a block diagram showing a structure of a sound processing portion equipped with an in-water characteristic correction device according to the second example. As shown in FIG. 13, the sound processing portion 6 includes an A/D conversion portion 61, a sound collection environment deciding device 62 and an in-water characteristic correction device 63b.

The in-water characteristic correction device 63b includes an LPF 6305 for extracting and delivering a low frequency band component below a predetermined frequency in the input audio signal, an HPF 6306 for extracting and delivering a high frequency band component above a predetermined frequency in the input audio signal, an amplifying portion 6307 for amplifying a high frequency band component delivered from the HPF 6306 based on a decision result of the sound collection environment deciding device 62 and a combining portion 6308 for combining the high frequency band component delivered from the amplifying portion 6307 and the low frequency band component delivered from the LPF 6305 so as to deliver the result audio signal.

The sound collection environment deciding device 62 decides whether or not the sound of the input audio signal was collected in water by the method described above. On the other hand, as to the in-water characteristic correction device 63b, the LPF 6305 extracts the low frequency band component in the input audio signal, and the HPF 6306 extracts the high frequency band component of the input audio signal. Then, if the sound collection environment deciding device 62 decides that the sound of the input audio signal was collected in water, the amplifying portion 6307 amplifies the high frequency band component delivered from the HPF 6306. In addition, if the sound collection environment deciding device 62 does not decide that the sound of the input audio signal was collected in water, the high frequency band component is delivered without being amplified. Then, the combining portion 6308 combines the low frequency band component and the high frequency band component so as to deliver the result audio signal.

As described above, the frequency characteristics of the audio signal of sound collected in air and the frequency characteristics of the audio signal of sound collected in water do not match each other. In particular, the audio signal of sound collected in water has a high frequency band that is attenuated more than the audio signal of sound collected in air has. Therefore, the reproduced sound may be very hard to listen or may be a grating sound, so that it becomes far from the audio signal of the user's intention.

However, if the in-water characteristic correction device 63b is configured as shown in this example, the high frequency band component of the audio signal of sound collected in water can be amplified. Therefore, the influence of the sound collection characteristics in water can be reduced from the audio signal of sound collected in water. In other words, it is possible to make the signal effectively be close to the audio signal of the user's intention.

Note that the cutoff frequency of the LPF 6305 and the HPF 6306 may be a certain frequency $\lambda_2$. In addition, the frequency $\lambda_2$ may be 4 kHz, for instance. In addition, the amplification quantity of gain of the amplifying portion 6307 may be 15 dB, for instance.

Although the LPF 6305 and the HPF 6306 are used for amplifying all the components above the frequency $\lambda_2$ in this example, it is possible to adopt another structure in which components in a predetermined frequency band are amplified. For instance, the HPF 6306 may be replaced with a BPF that passes a frequency component of a band between the upper limit frequency $\lambda_2$ and the upper limit frequency $\lambda_b$, so that the frequency component after passing through this BPF is amplified by the amplifying portion 6307. Further, in this case, the LPF 6305 may be replaced with a BEF that passes a frequency component of a band above the frequency $\lambda_b$ and below the frequency $\lambda_2$.

<Third Example of the In-Water Characteristic Correction Device>

Figure 14:
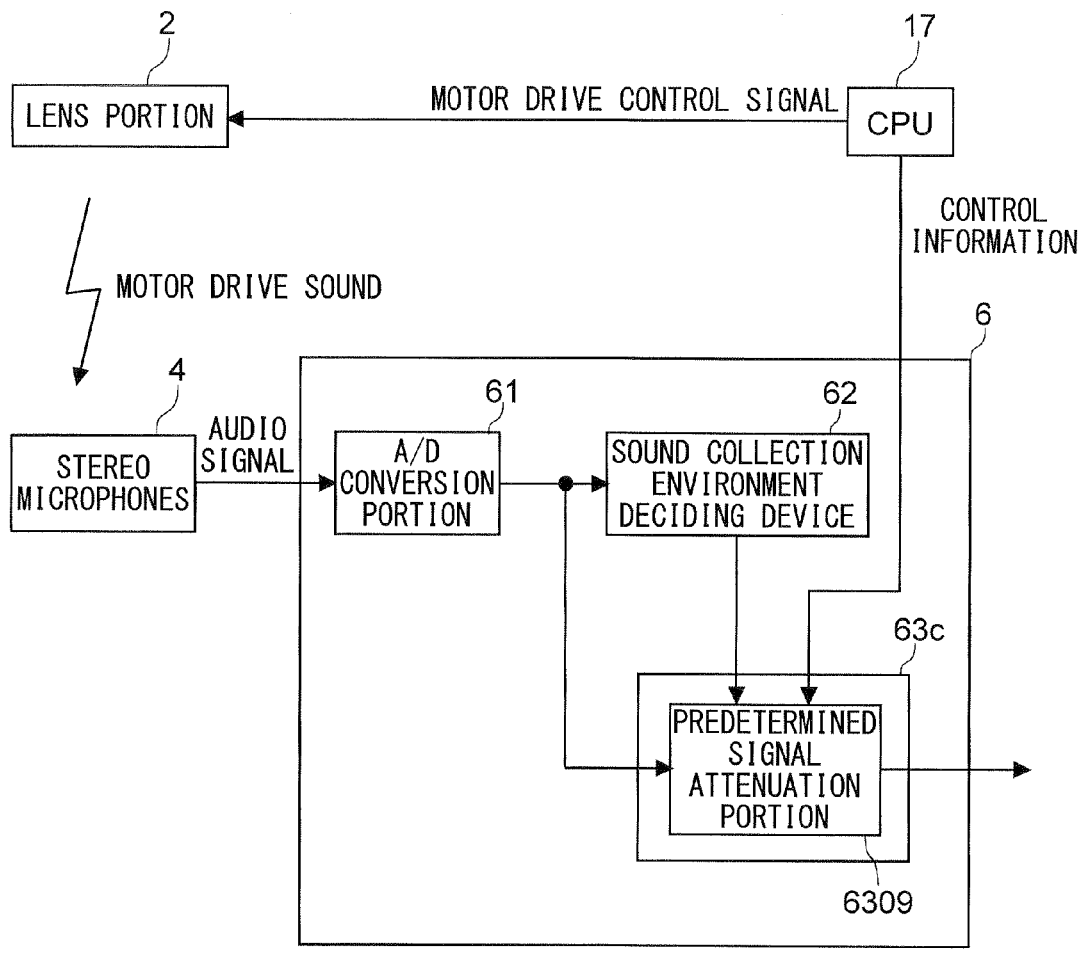
FIG. 14 is a block diagram showing a structure of a sound processing portion including an in-water characteristic correction device of a third example.

Next, a third example of the in-water characteristic correction device will be described with reference to the drawings. FIG. 14 is a block diagram showing a structure of a sound processing portion equipped with an in-water characteristic correction device of the third example. As shown in FIG. 14, the sound processing portion 6 includes the A/D conversion portion 61, the sound collection environment deciding device 62 and an in-water characteristic correction device 63*c*.

The in-water characteristic correction device 63*c* includes a predetermined signal attenuation portion 6309 for attenuating the component of a predetermined frequency band in the input audio signal based on a decision result of the sound collection environment deciding device 62 and control information delivered from the CPU 17. Note that the predetermined signal attenuation portion 6309 may include a filter such as a notch filter for attenuating the component of the predetermined frequency band.

The sound collection environment deciding device 62 decides whether or not the sound of the input audio signal was collected in water by the method described above and delivers the decision result to the predetermined signal attenuation portion 6309. In addition, the CPU 17 supplied the lens portion 2 with a motor drive control signal for driving the motor for changing the optical zoom magnification of the lens portion 2 described above, and it supplies the predetermined signal attenuation portion 6309 with control information indicating the drive information. The predetermined signal attenuation portion 6309 detects the drive of the motor in the lens portion 2 based on the control information.

Then, if the sound collection environment deciding device 62 decides that the sound of the input audio signal was collected in water and if the CPU 17 delivers the control information indicating the drive of the motor, the predetermined signal attenuation portion 6309 works so that the component of the predetermined frequency band in the input audio signal is attenuated.

Figure 15:
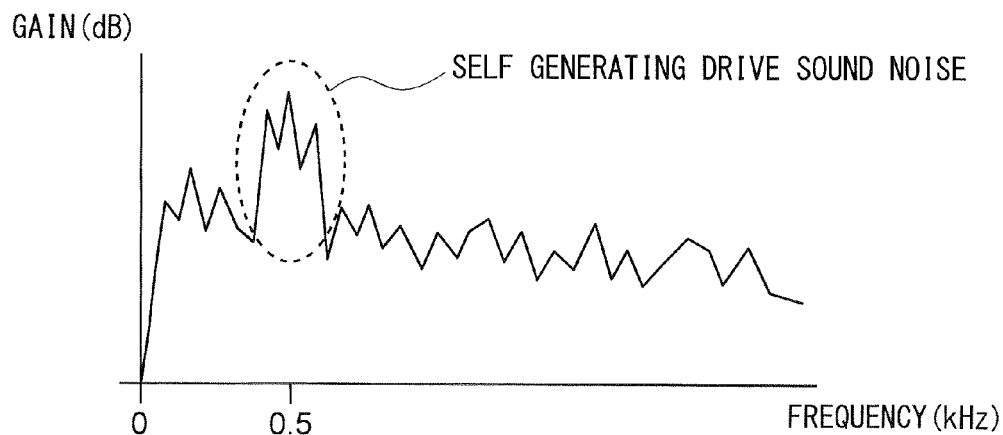
FIG. 15 is a graph showing self generating drive sound noise included in an audio signal of sound collected in water.

If the in-water characteristic correction device 63*c* is configured as described in this example, it is possible to attenuate self generating drive sound noise that is generated when the motor or the like is driven, for instance. This self generating drive sound noise is shown in FIG. 15. FIG. 15 is a graph showing self generating drive sound noise included in the audio signal of sound collected in water. In addition, FIG. 15 is a graph like FIG. 4 and FIG. 5, which shows frequency characteristics of the audio signal showing the low frequency band in an enlarged manner.

FIG. 15 shows the case where the self generating drive sound noise (see the part enclosed by a broken line) is generated with a center frequency of 0.5 kHz. Since a frequency of such the self generating drive sound noise depends on an apparatus used as the imaging apparatus 1, it can be known in advance which frequency band causes the self generating drive sound noise. Therefore, if the predetermined signal attenuation portion 6309 is set in such a manner that the components of the frequency band (signals at the vicinity of 0.5 kHz in the case shown in FIG. 15) are attenuated, the self generating drive sound noise can be attenuated.

In particular, if sound is collected in water, sound collection sensitivity with respect to a noise signal such as self generating drive sound noise is increased and is apt to be emphasized. Therefore, although the self generating drive sound noise is not grating sound if it is collected in air, it can be grating sound if it is collected in water.

However, since the self generating drive sound noise is attenuated if it is decided that the sound of the audio signal was collected in water as described in this example, a noise signal that is apt to be emphasized can be reduced effectively. Therefore, it is possible to reduce an influence of the sound collection characteristics in water from the audio signal of sound collected in water. In other words, it is possible to make the signal effectively be close to the audio signal of the user's intention.

In addition, since the component of the frequency band of the self generating drive sound noise is attenuated when the imaging apparatus 1 is driven, the self generating drive sound noise can be attenuated selectively. Therefore, deterioration of the audio signal due to the attenuation can be reduced as much as possible.

Note that the sound collection environment decision and the in-water characteristic correction process can be performed individually based on the same information if the control information delivered from the CPU 17 is similar to the time information described above. Therefore, structures of the CPU 17 and the sound processing portion 6 as well as actions thereof can be simplified. In this case, it is possible to adopt a structure in which the CPU 17 delivers the control information to the sound collection environment deciding device 62 so as to decide whether or not the predetermined signal attenuation portion 6309 is required to work, based on only the signal from the sound collection environment deciding device 62.

In addition, the self generating drive sound noise is not always caused by drive of the motor in the lens portion 2. In other words, even if the self generating drive sound noise is caused by other device, it can be reduced.

<Fourth Example of the In-Water Characteristic Correction Device>

Figure 16:
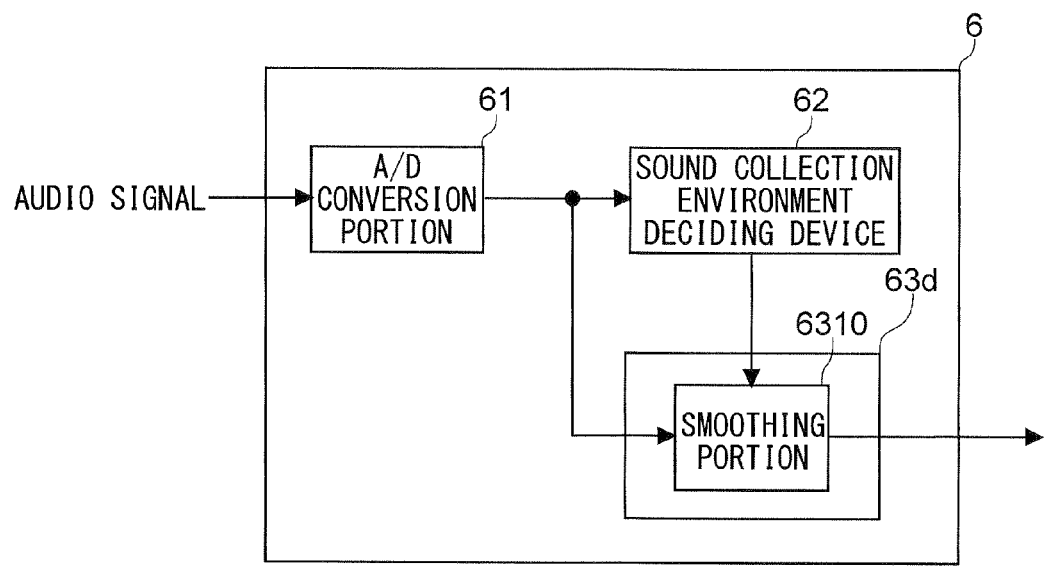
FIG. 16 is a block diagram showing a structure of a sound processing portion including an in-water characteristic correction device of a fourth example.

Next, a fourth example of the in-water characteristic correction device will be described with reference to the drawings. FIG. 16 is a block diagram showing a structure of a sound processing portion equipped with an in-water characteristic correction device of the fourth example. As shown in FIG. 16, the sound processing portion 6 is equipped with the A/D conversion portion 61, the sound collection environment deciding device 62 and an in-water characteristic correction device 63*d*.

The in-water characteristic correction device 63*d* includes a smoothing portion 6310 for smoothing the input audio signal based on a decision result of the sound collection environment deciding device 62. Note that this smoothing portion 6310 may include a filter such as a smoothing filter for performing a smoothing process, for instance.

The sound collection environment deciding device 62 decides whether or not the sound of the input audio signal was collected in water by the method as described above and delivers a result of the decision to the smoothing portion 6310. Then, if the sound collection environment deciding device 62 decides that the sound of the input audio signal was collected in water, the smoothing portion 6310 works so as to perform the smoothing process of the input audio signal.

Figure 17A:
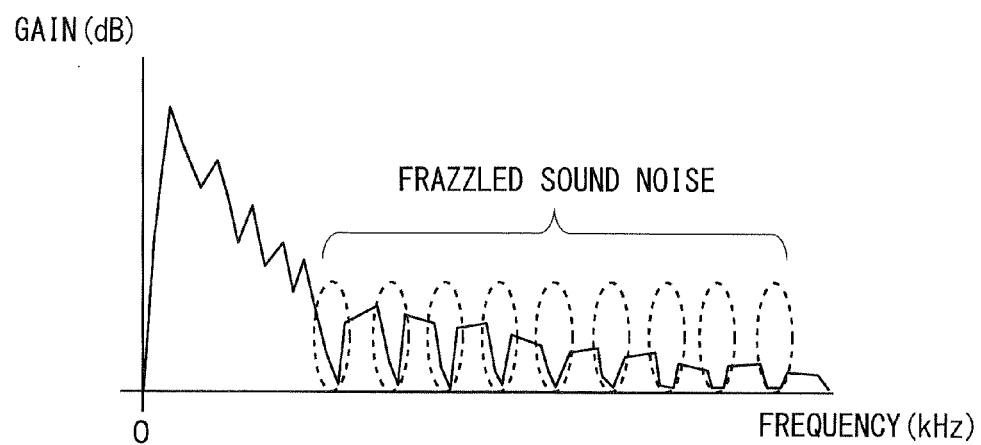
FIG. 17A is a graph showing frazzled sound noise included in an audio signal of sound collected in water.
Figure 17B:
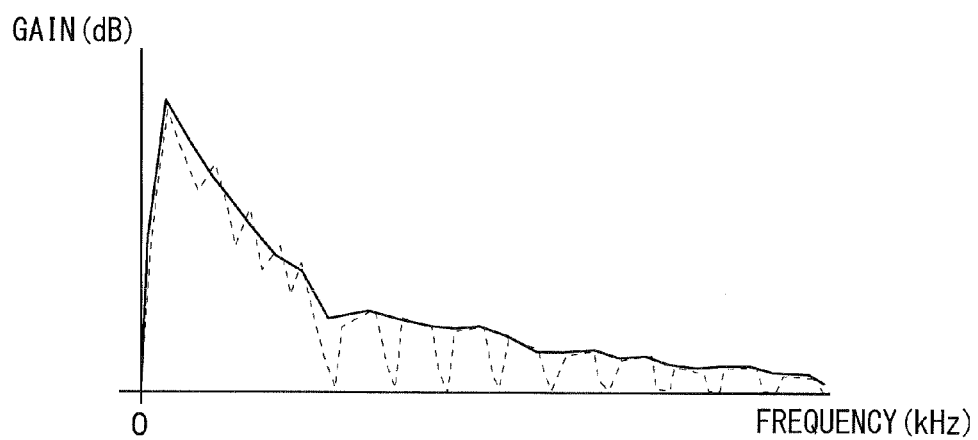
FIG. 17B is a graph showing a process of a smoothing portion.

Since the in-water characteristic correction device 63d is configured as described in this example, frazzled sound noise can be reduced. The frazzled sound noise and the process of the smoothing portion will be shown in FIGS. 17A and 17B. FIGS. 17A and FIG. 17B are graphs showing the frazzled sound noise included in the audio signal of sound collected in water and the process of the smoothing portion. In addition, FIGS. 17A and 17B are graphs showing the frequency characteristics of audio signals of collected sounds.

As shown in FIG. 17A, when the self generating drive sound noise (see the part enclosed by a broken line) is generated, the intensity of a nonspecific frequency signal is attenuated locally. Therefore, the smoothing portion 6310 performs the smoothing process on the input audio signal so that the frazzled sound noise is reduced. FIG. 17B shows the audio signal after the smoothing process (in the solid line) and the audio signal before the smoothing process (in the broken line) for comparison. As shown in FIG. 17B, the smoothing process enables to reduce attenuation quantity of the portion to be attenuated locally. In other words, the frazzled sound noise can be reduced.

As described above, if the sound collection is performed in water, the sound collection sensitivity with respect to the noise signal increases and is apt to be emphasized. In other words, the frazzled sound noise is apt to be emphasized particularly in the audio signal of sound collected in water. Therefore, although the frazzled sound noise is not grating sound if it is collected in air, it can be grating sound if it is collected in water.

However, since the frazzled sound noise is reduced if the sound collection environment deciding device 62 decides that the sound of the audio signal is collected in water as described in this example, the noise signal that is apt to be emphasized can be reduced effectively. Therefore, it is possible to reduce an influence of the sound collection characteristics in water from the audio signal of sound collected in water. In other words, it is possible to make the signal effectively be close to the audio signal of the user's intention.

Note that this example can be applied to general noise generated in the frequency axis direction without limiting to the frazzled sound noise. For instance, the smoothing portion 6310 of this example can be used instead of the predetermined signal attenuation portion 6309 described above for dealing with noise of a predetermined frequency (self generating drive sound noise) due to the focusing action or the zooming action.

In addition, a method of using an arithmetic mean value can be utilized as the smoothing process performed by the smoothing portion 6310. The arithmetic mean value x'[f] that is used in this method is obtained by summing up signal values x[i] of individual frequencies i (Hz) included in a frequency range Fa (Hz) with a center frequency f (Hz) and by dividing the sum value by Fa. More specifically, it is obtained from a calculation equation shown in Equation (1) below.

$$x'[f] = \frac{1}{Fa} \sum_{i=f-(Fa/2)+1}^{f+(Fa/2)} x[i] \quad (1)$$

Figure 18:
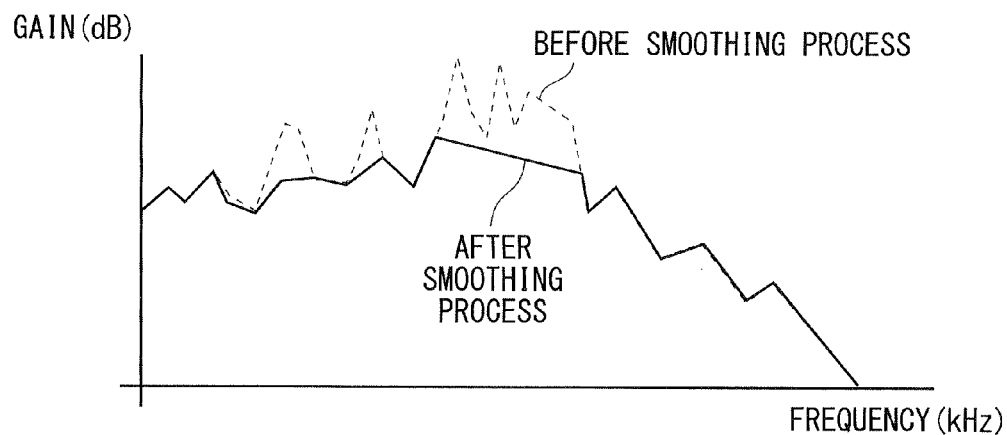
FIG. 18 is a graph showing noise included in the audio signal of sound collected in water and a process of a smoothing portion.

Then, if the obtained arithmetic mean value x'[f] is smaller than the signal value x[f], the value of the arithmetic mean value x'[f] is adopted as a signal value at the frequency f. In contrast, if the arithmetic mean value x'[f] is larger than the signal value x[f], the value of the signal value x[f] is adopted as it is. A schematic diagram when the smoothing portion 6310 performs such the smoothing process is shown in FIG. 18. FIG. 18 is a graph showing noise due to focusing sound and the process of the smoothing portion. A broken line shows a signal value before the smoothing process, and a solid line shows a signal value after the smoothing process.

As shown in FIG. 18, the signal before the smoothing process shows abrupt increases of the intensity at several frequency bands. In addition, such the noise is a signal of a low frequency band in many cases and is therefore a signal that is apt to be emphasized in water as described above. Thus, the signal of this frequency band can be noise for the auditory sense. However, if the smoothing process is performed as described in this example, the signal can be the one as shown in the solid line. In other words, it is possible to reduce the signal value in the frequency band in which the intensity increases abruptly so that the noise can be reduced.

Note that Fa (number) values from x[f-(Fa/2)+1] to x[f+(Fa/2)] are summed up in the Equation (1) for calculating x'[f], but it is possible to sum up values from x[f-(Fa/2)] to x[f+(Fa/2)-1]. In addition, although the above example shows the case where Fa is an even number, it is possible to set Fa as an odd number so that values from x[f-(Fa/2)+½] to x[f+(Fa/2)-½] are summed up and the sum is divided by Fa so as to obtained the arithmetic mean value x'[f].

In addition, it is possible to deal with not only noise that occurs on the frequency axis but also noise that occurs on the time axis direction by performing the smoothing process. In this case, it is possible to apply the process using the arithmetic mean value similarly to the above Equation (1). However, the arithmetic mean value is calculated in the time axis direction in this case.

The arithmetic mean value x'[t] to be determined can be obtained by summing up signal values x[k] at individual time points k (sec) included in the time period Ta (sec) with the center time point t(sec), and by dividing the sum by Ta. More specifically, it can be obtained from the calculation equation shown in Equation (2) below.

$$x'[t] = \frac{1}{Ta} \sum_{k=t-(Ta/2)+1}^{t+(Ta/2)} x[k] \quad (2)$$

Similarly to the case of reducing noise occurring in the frequency axis direction as described above, if the obtained arithmetic mean value x'[t] is smaller than the signal value x[t], the value of the arithmetic mean value x'[t] is adopted as a signal value at the time point t. In contrast, if the arithmetic mean value x'[t] is larger than the signal value x[t], the value of the signal value x[t] is adopted as it is. Since such the smoothing process is performed, even if an abrupt and large noise occurs due to contact between the case of the imaging apparatus and something, the noise can be reduced.

Note that Fa (number) values from x[t-(Ta/2)+1] to x[t+(Ta/2)] are summed up in the Equation (2) for calculating x'[t], but it is possible to sum up values from x[t−(Ta/2)] to x[t+(Ta/2)−1]. In addition, although the above example shows the case where Ta is an even number, it is possible to set Ta as an odd number so that values from x[t−(Ta/2)+½] to x[t+(Ta/2)−½] are summed up and the sum is divided by Ta so as to obtained the arithmetic mean value x'[t].

In addition, although the example of using the arithmetic mean value is described above as the smoothing process performed in the frequency axis direction and in the time axis direction, this example is not limited to this method. In particular, other method may be used as long as the method can perform the smoothing process.

<Fifth Example of the In-Water Characteristic Correction Device>

Figure 19:
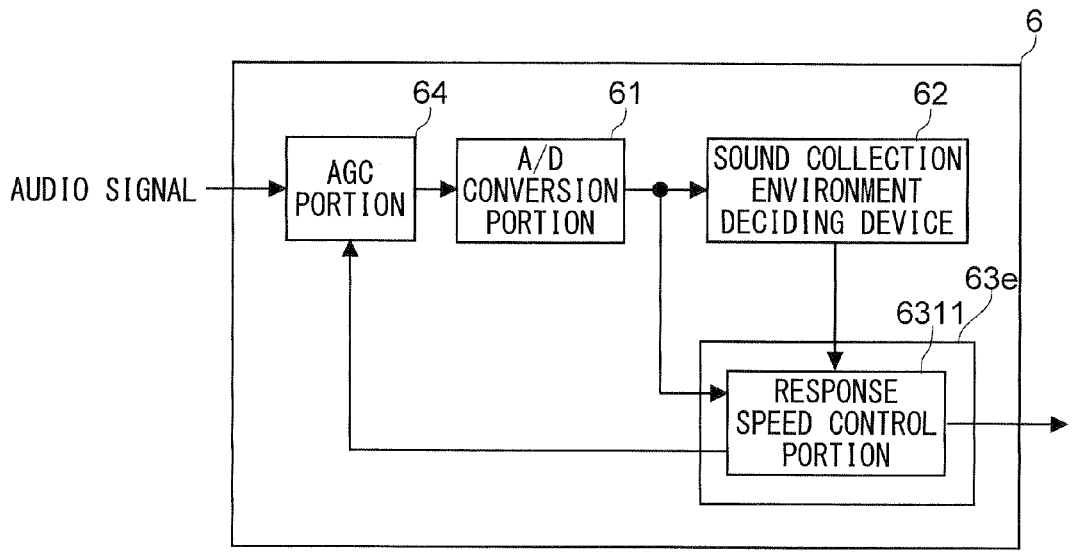
FIG. 19 is a block diagram showing a structure of a sound processing portion including an in-water characteristic correction device of a fifth example.

Next, a fifth example of the in-water characteristic correction device will be described with reference to the drawings. FIG. 19 is a block diagram showing a structure of a sound processing portion equipped with an in-water characteristic correction device of the fifth example. As shown in FIG. 19, the sound processing portion 6 includes an automatic gain control (AGC) portion 64 for controlling gain of the input audio signal, an A/D conversion portion 61 that is supplied with an audio signal delivered from the AGC portion 64, the sound collection environment deciding device 62 and an in-water characteristic correction device 63e. In addition, the in-water characteristic correction device 63e includes a response speed control portion 6311 for controlling response speed of the AGC portion 64 based on a decision result of the sound collection environment deciding device 62. Although the AGC portion 64 is shown only in FIG. 19 showing this example, it is possible to dispose the AGC portion 64 in other examples.

The AGC portion 64 monitors intensity of the input audio signal and attenuates the same when the intensity of the audio signal increases to be larger than a predetermined value while it amplifies the same when the intensity of the audio signal decreases to be smaller than a predetermined value. The AGC portion 64 works like this so as to control intensity of the audio signal to be an intensity value suitable for the post process.

Figure 20:
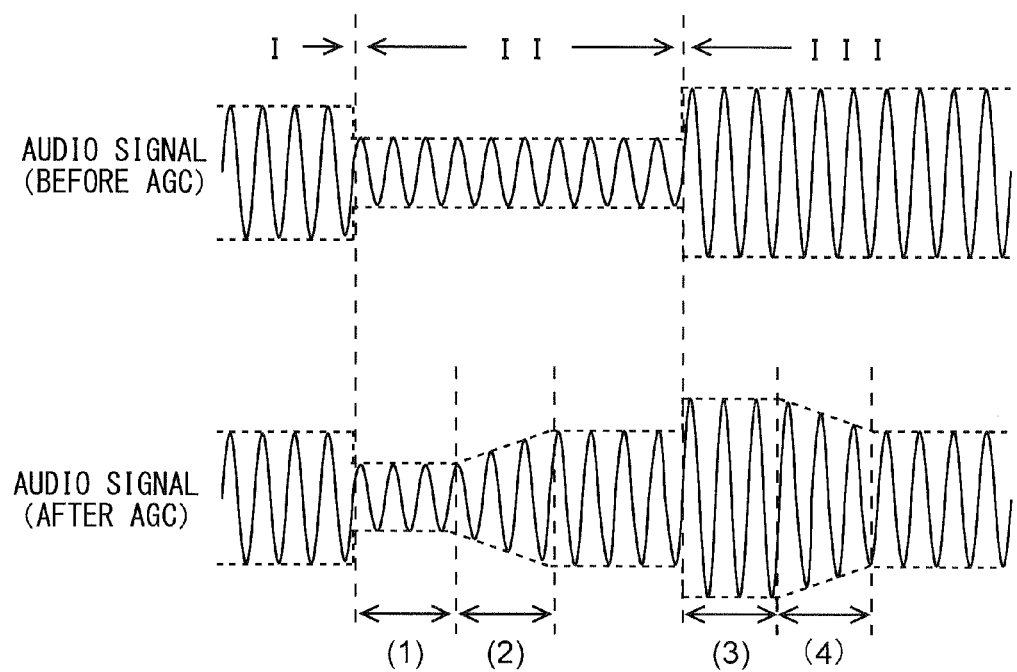
FIG. 20 is a graph showing a concrete example of an AGC portion.

A concrete example of action of the AGC portion 64 will be described with reference to FIG. 20. FIG. 20 is a graph showing a concrete example of action of the AGC portion. The wave in the diagram shows the audio signal schematically. In addition, the broken lines on the upper and the lower sides of the wave show time variation of the amplitude (intensity) of the audio signal. Further in FIG. 20, the intensity of the audio signal in section I is equal to a set value, the intensity in section II is smaller than the intensity in the section I, and the intensity in section III is larger than the intensity in the section I.

As shown in FIG. 20, when the AGC portion 64 recognizes that the intensity of the audio signal becomes smaller than the set value in the section II, an increasing ratio is set in the section (1) for making the intensity be equal to the set value. Then, in the section (2) the audio signal is amplified at the increasing ratio set in the section (1) so that the intensity of the audio signal is adjusted to be equal to the set value at the end of the section (2). In contrast, when the AGC portion 64 recognizes that the intensity of the audio signal becomes larger than the set value in the section III, a decreasing ratio is set in the section (3) for making the intensity be equal to the set value. Then, in the section (4) the audio signal is attenuated at the decreasing ratio set in the section (3) so that the intensity of the audio signal is adjusted to be equal to the set value at the end of the section (4).

In addition, the sound collection environment deciding device 62 decides whether or not the sound of the input audio signal was collected in water by the method described above and supplies a result of the decision to the response speed control portion 6311. Then, if the sound collection environment deciding device 62 decides that the sound of the input audio signal was collected in water, the response speed control portion 6311 control the response speed in the AGC portion 64 to be faster than that in the case where it is not decided to be in water. For instance, if the AGC portion 64 performs the control as shown in FIG. 20, the response control portion 6311 performs the control for shortening each of the sections (1), (2), (3) and (4).

Figure 21A:
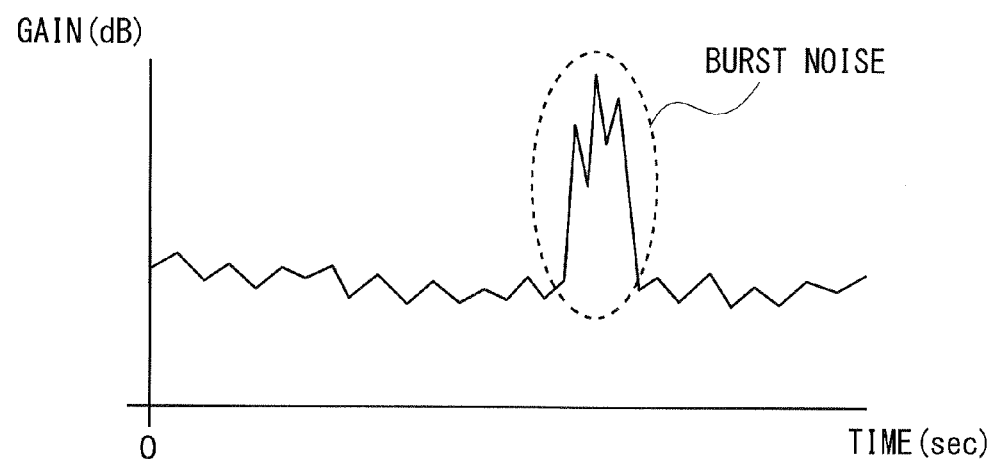
FIG. 21A is a graph showing burst noise included in an audio signal of sound collected in water.
Figure 21B:
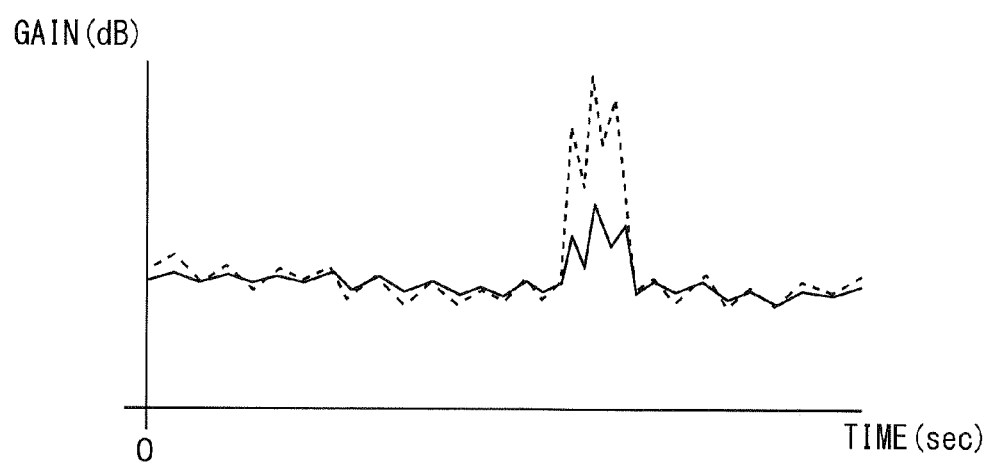
FIG. 21B is a graph showing a process of a response speed control portion.

Since the in-water characteristic correction device 63e is configured as described in this example, burst noise such as click noise can be reduced. This burst noise is shown in FIGS. 21A and 21B. FIGS. 21A and 21B are graphs showing the burst noise included in the audio signal of sound collected in water and a process of the response speed control portion. In the graphs shown in FIGS. 21A and 21B, the horizontal axis represents time while the vertical axis represents gain. In addition, FIG. 21A is a graph showing the state where the response speed control portion 6311 does not perform the control for increasing the response speed of the AGC portion 64 (the state of the response speed set to the same value as the case where it is not decided to be in water), and FIG. 21B is a graph showing the state where the control for increasing the response speed is performed.

As shown in FIG. 21A, when burst noise (see the part enclosed by a broken line) occurs, a part is generated in which intensity of the signal increases locally in the time axis direction. In order to suppress the local increase of the signal intensity, the response speed control portion 6311 controls the response speed of the AGC portion 64 to be increased. FIG. 21B shows a graph of the audio signal when the response speed is increased (in the solid line) together with a graph of the audio signal before the response speed is increased for comparison (in the broken line). As shown in FIG. 21B, when the response speed is increased, the AGC is performed promptly with reference to noise. Therefore, it is possible to suppress the local increase of the signal intensity. In other words, the burst noise can be reduced.

As described above, if the sound collection is performed in water, the sound collection sensitivity with respect to the noise signal increases and is apt to be emphasized. In other words, the burst noise is apt to be emphasized particularly in the audio signal of sound collected in water. Therefore, although the burst noise is not grating sound if it is collected in air, it can be grating sound if it is collected in water.

However, since the burst noise is reduced if the sound collection environment deciding device 62 decides that the sound of the audio signal is collected in water as described in this example, the noise signal that is apt to be emphasized can be reduced effectively. Therefore, it is possible to reduce an influence of the sound collection characteristics in water from the audio signal of sound collected in water. In other words, it is possible to make the signal effectively be close to the audio signal of the user's intention.

Note that the influence of the sound collection characteristics in water can be reduced similarly in the case where the intensity of the signal decreases locally due to the burst noise, too. In this case, the AGC portion 64 amplifies the signal promptly so that the decrease of the signal intensity can be suppressed.

<Sixth Example of the In-Water Characteristic Correction Device>

Figure 22:
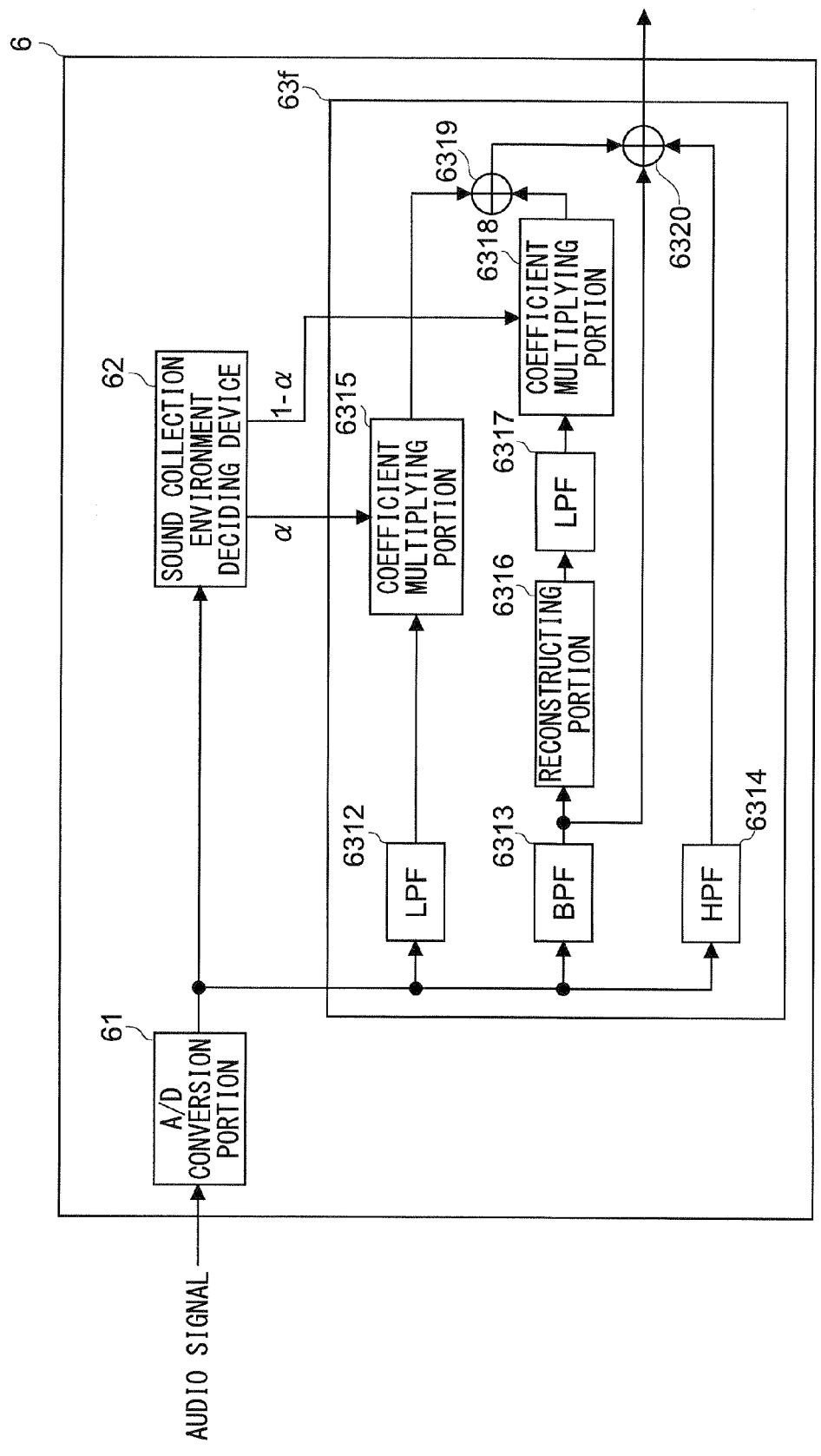
FIG. 22 is a block diagram showing a structure of a sound processing portion including an in-water characteristic correction device of a sixth example.

Next, a sixth example of the in-water characteristic correction device will be described with reference to the drawings. FIG. 22 is a block diagram showing a structure of a sound processing portion equipped with an in-water characteristic correction device of the sixth example. As shown in FIG. 22, the sound processing portion 6 includes the A/D conversion portion 61, the sound collection environment deciding device 62 and an in-water characteristic correction device 63$f$.

The in-water characteristic correction device 63$f$ includes an LPF 6312 for extracting and delivering a low frequency band component below a predetermined frequency in the input audio signal, a BPF 6313 for extracting and delivering a middle frequency band component to be a predetermined frequency band in the input audio signal, an HPF 6314 for extracting and delivering a high frequency band component above a predetermined frequency in the input audio signal, a coefficient multiplying portion 6315 for multiplying a mixing coefficient α delivered from the sound collection environment deciding device 62 to a low frequency band component delivered from the LPF 6312, a reconstructing portion 6316 for reconstructing the audio signal based on the middle frequency band component delivered from the BPF 6313 so as to deliver the reconstructed signal, an LPF 6317 for extracting a low frequency band component from the reconstructed signal delivered from the reconstructing portion 6316 so as to deliver a reconstructed low frequency band component, a coefficient multiplying portion 6318 for multiplying a mixing coefficient (1−α) delivered from the sound collection environment deciding device 62 to the reconstructed low frequency band component delivered from the LPF 6317, a combining portion 6319 for combining the low frequency band component delivered from the coefficient multiplying portion 6315 with the reconstructed low frequency band component delivered from the coefficient multiplying portion 6318 so as to deliver the combined low frequency band component, and a combining portion 6320 for combining the combined low frequency band component delivered from the combining portion 6319, the middle frequency band component delivered from the BPF 6313 and the high frequency band component delivered from the HPF 6314 so as to deliver the audio signal.

The sound collection environment deciding device 62 decides whether or not the sound of the input audio signal was collected in water by the method as described above. On the other hand, the in-water characteristic correction device 63$f$ extracts the low frequency band component of the input audio signal in the LPF 6312. In addition, it extracts the middle frequency band component of the input audio signal in the BPF 6313 and extracts the high frequency band component of the input audio signal in the HPF 6314.

If the sound collection environment deciding device 62 decides that the sound of the input audio signal was collected in water, the coefficient multiplying portion 6315 multiplies the mixing coefficient α to the low frequency band component delivered from the LPF 6312 so as to deliver the result. In addition, the middle frequency band component delivered from the BPF 6313 is reconstructed by the reconstructing portion 6316 and is delivered as the reconstructed signal. On this occasion, the reconstructing portion 6316 performs a nonlinear process on the middle frequency band component to be input. The nonlinear process means, for instance, a square process, a full-wave rectification process (absolute value process), a half-wave rectification process or the like.

If the square process is used, the reconstructing portion 6316 calculates the square of the middle frequency band component delivered from the BPF 6313. In this case, since the middle frequency band component includes harmonic components of a pitch signal of the sound collected by the stereo microphones 4 (harmonic components of a fundamental frequency), the square process generates signals having frequencies corresponding to the difference and sum of the harmonic components. Therefore, the harmonic components (a fundamental wave component of the fundamental frequency and the harmonic components) are generated in a lower frequency band than the middle frequency band component and in a higher frequency band than the same. Therefore, it is possible to reconstruct the low frequency band component and the high frequency band component from the middle frequency band component. Note that amplitude of the generated harmonic component becomes the square of the harmonic component to be determined when the square process is performed. Concerning this fact, a normalization process may be performed on the signal after the square process so that the amplitude can be adjusted.

The full-wave rectification process (absolute value process) and the half-wave rectification process can be performed in the same manner. For instance, if the full-wave rectification is used, the absolute value of the middle frequency band component is calculated for the reconstruction. In addition, it is possible to use the method described in JP-A-8-130494, JP-A-8-278800, JP-A-9-55778 or the like as for the above-mentioned reconstruction method, for instance.

The reconstructing portion 6316 performs the reconstruction by using the method described above so as to deliver the reconstructed signal. The LPF 6317 extracts the low frequency band component from the supplied reconstructed signal so as to generate the reconstructed low frequency band component and delivers the same. Then, the reconstructed low frequency band component is supplied to the coefficient multiplying portion 6318, in which the mixing coefficient (1−α) us multiplied. In addition, the reconstructed low frequency band component to which the mixing coefficient (1−α) is multiplied and the low frequency band component to which the mixing coefficient α is multiplied are combined in the combining portion 6319 and are delivered as one combined low frequency band component.

Then, the combined low frequency band component delivered from the combining portion 6319, the middle frequency band component delivered from the BPF 6313 and the high frequency band component delivered from the HPF 6314 are combined in the combining portion 6320 and are delivered as one audio signal.

Figure 23:
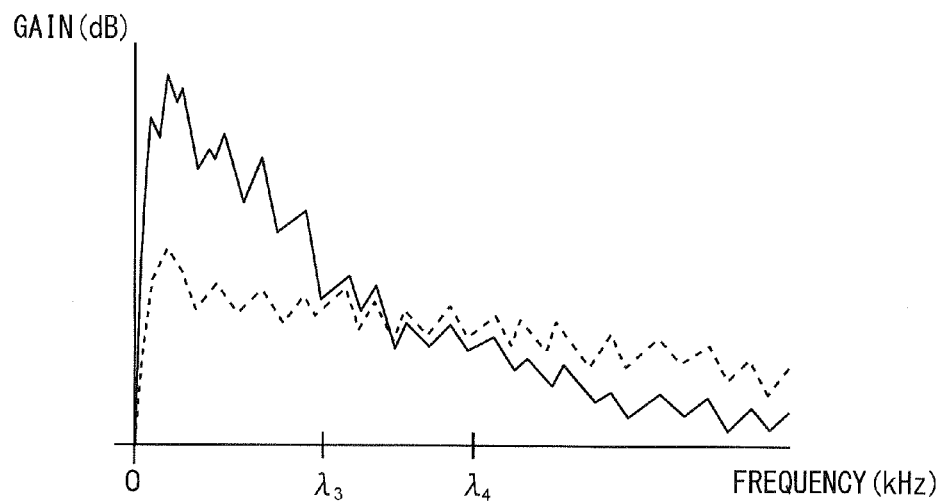
FIG. 23 is a schematic graph showing an audio signal of sound collected in water together with an audio signal of sound collected in air.

Since the in-water characteristic correction device 63$f$ is configured as described in this example, the signal of the low frequency band component can be improved. An effect of this improvement will be described with reference to FIG. 23. FIG. 23 is a schematic graph showing the audio signal of sound collected in water and the audio signal of sound collected in air, which is a graph showing frequency characteristics of the audio signal of collected sound.

As described above, compared with the audio signal of sound collected in air (broken line), the audio signal of sound collected in water (solid line) has intensity concentrated more in the low frequency band and has intensity attenuated more in the high frequency band. Therefore, the audio signal of sound collected in water is different from the audio signal of sound collected in air. However, as shown in FIG. 23, the audio signal of sound collected in water is similar to the audio signal of sound collected in air in the middle frequency band between the frequency $\lambda_3$ and the frequency $\lambda_4$. In other words, this frequency band is hardly affected by the sound collection environment so that a good signal can be obtained even if the sound of the audio signal is collected in water. Therefore, the signal in other frequency band reconstructed based on the signal of this frequency band can be a better signal than the signal of the sound that was collected in water.

Therefore, since the combined low frequency band component delivered from the combining portion 6319 includes the reconstructed low frequency band component if the sound collection environment deciding device 62 decides to be the audio signal of sound collected in water as described in this example, the audio signal delivered from the combining portion 6320 can be improved. Therefore, it is possible to reduce an influence of the sound collection characteristics in water from the audio signal of sound collected in water. In other words, it is possible to make the signal effectively be close to the audio signal of the user's intention.

Note that it is possible to set the cutoff frequency of the LPF 6312 and the LPF 6317 to be $\lambda_3$ and the cutoff frequency of the HPF to be $\lambda_4$ in order to enable the combination described above. In addition, it is possible to set the cutoff frequency of the BPF 6313 on the low frequency side to be $\lambda_3$ and the cutoff frequency on the high frequency side to be $\lambda_4$. In addition, it is possible to set $\lambda_3$ to be 2 kHz and $\lambda_4$ to be 6 kHz, for instance.

In addition, it is possible to set the mixing coefficient $\alpha$ to be a small value if the sound collection environment deciding device 62 decides that the sound was collected in water and to set the mixing coefficient $\alpha$ to be a large value if it decides that the sound was not collected in water. In addition, it is possible to set the mixing coefficient $\alpha$ to be one if the sound collection environment deciding device 62 decides that the sound was not collected in water. If the mixing coefficient $\alpha$ is set to one, the low frequency band component delivered from the LPF 6312 passes through the coefficient multiplying portion 6315 and the combining portion 6319 as it is, so as to be supplied to the combining portion 6320. In other words, the combined low frequency band component delivered from the combining portion 6319 becomes equal to the low frequency band component. In addition, it is possible to adopt another structure in which the reconstructing portion 6316 does not perform the reconstruction process in this case.

In addition, it is possible to decide deterioration degree of the input audio signal based on the input intensity of the audio signal or the like so as to change the value of the mixing coefficient $\alpha$. In addition, if it is decided that the deterioration degree is large, it is possible to decrease the value of the mixing coefficient $\alpha$. In addition, it is possible that the mixing coefficient $\alpha$ is zero.

In addition, although the in-water characteristic correction device 63f shown in FIG. 22 has the structure in which the low frequency band component is reconstructed from the middle frequency band component, it is possible to reconstruct the high frequency band component similarly so as to produce a reconstructed high frequency band component and to combine the same with the high frequency band component delivered from the HPF 6314 at a predetermined ratio.

Figure 24:
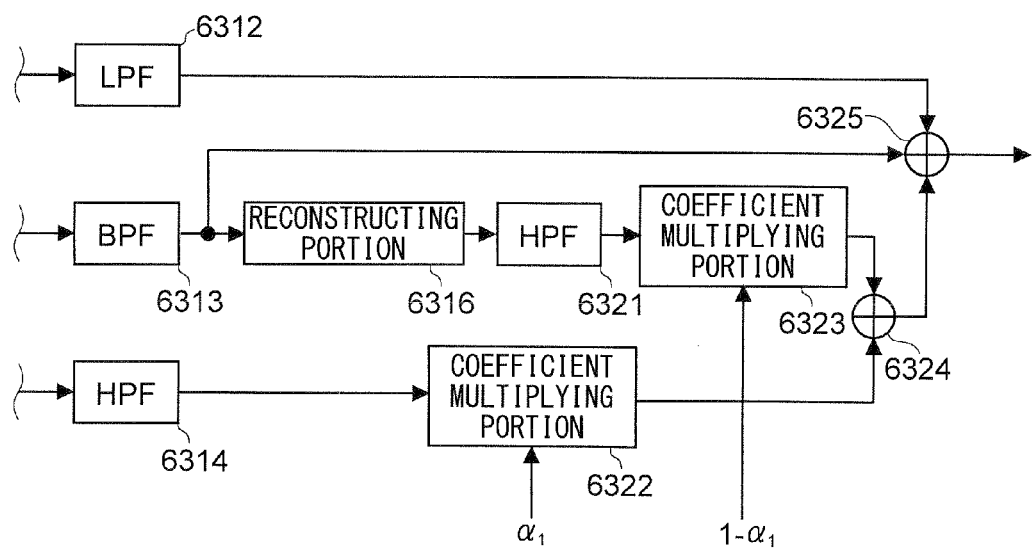
FIG. 24 is a block diagram showing a structure of another example of the in-water characteristic correction device according to the sixth example.

This structure will be shown in FIG. 24. FIG. 24 is a block diagram showing a structure of another example of the in-water characteristic correction device of the sixth example. The in-water characteristic correction device 63fa shown in FIG. 24 includes the LPF 6312, the BPF 6313, the HPF 6314, the reconstructing portion 6316, a HPF 6321 for extracting a high frequency band component from the reconstructed signal delivered from the reconstructing portion 6316 so as to deliver a reconstructed high frequency band component, a coefficient multiplying portion 6322 for multiplying a mixing coefficient $\alpha_1$ delivered from the sound collection environment deciding device 62 to the high frequency band component delivered from the HPF 6314, a coefficient multiplying portion 6323 for multiplying a mixing coefficient $(1-\alpha_1)$ delivered from the sound collection environment deciding device 62 to the reconstructed high frequency band component delivered from the HPF 6321, a combining portion 6324 for combining the high frequency band component delivered from the coefficient multiplying portion 6322 with the reconstructed high frequency band component delivered from the coefficient multiplying portion 6323 so as to deliver the combined high frequency band component, and a combining portion 6325 for combining the combined high frequency band component delivered from the combining portion 6324, the middle frequency band component delivered from the BPF 6313 and the low frequency band component delivered from the LPF 6312 so as to deliver the audio signal.

This in-water characteristic correction device 63fa is different from the in-water characteristic correction device 63f in that it performs reconstruction and combination of not the low frequency band components but the high frequency band components. However, other operations are the same so descriptions thereof will be omitted.

In addition, it is possible to adopt another structure in which the low frequency band component and the high frequency band component are reconstruct so that the reconstructed low frequency band component and the reconstructed high frequency band component are produced individually and are combined with the low frequency band component delivered from the LPF 6312 and the high frequency band component delivered from the HPF 6314, respectively, at a predetermined ratio.

Figure 25:
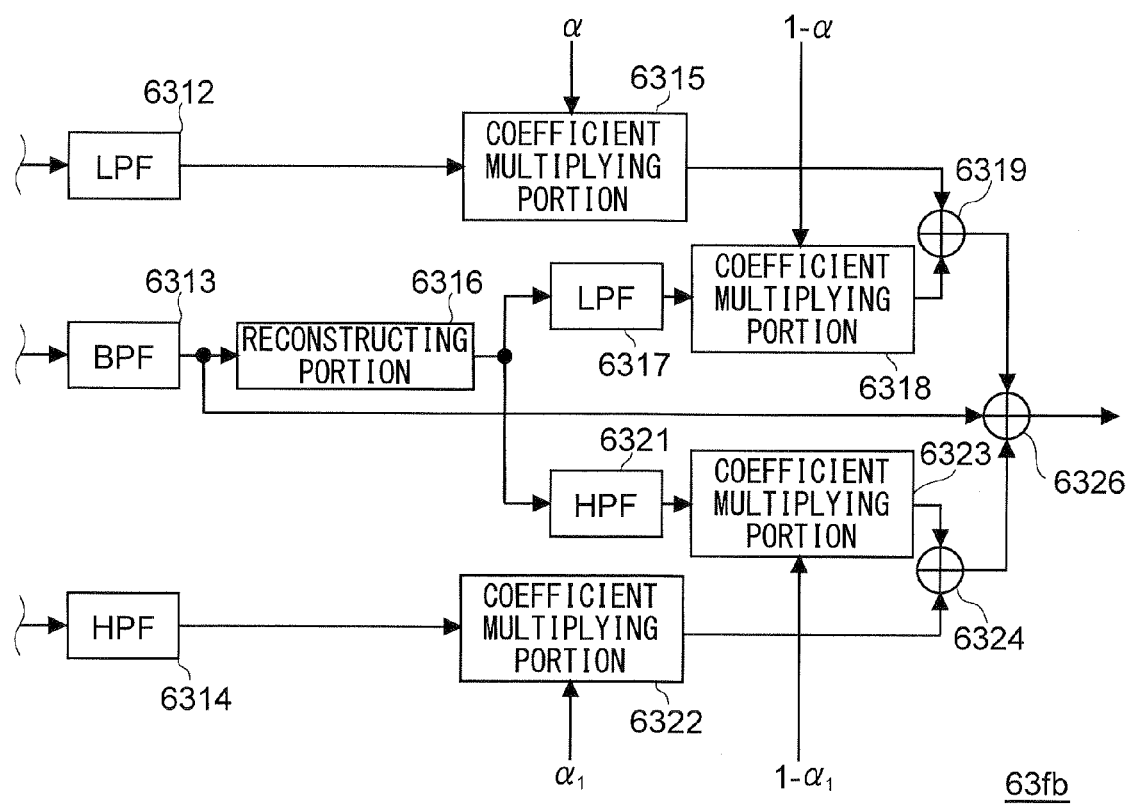
FIG. 25 is a block diagram showing a structure of a still another example of the in-water characteristic correction device according to the sixth example.

This structure will be shown in FIG. 25. FIG. 25 is a block diagram showing a structure of another example of the in-water characteristic correction device according to the sixth example. The in-water characteristic correction device 63fb shown in FIG. 25 includes the LPF 6312, the BPF 6313, the HPF 6314, the reconstructing portion 6316, the LPF 6317, the HPF 6321, the coefficient multiplying portion 6315, the coefficient multiplying portion 6322, the coefficient multiplying portion 6318, the coefficient multiplying portion 6323, the combining portion 6319, the combining portion 6324, a combining portion 6326 for combining the combined low frequency band component delivered from the combining portion 6319, the middle frequency band component delivered from the BPF 6313 and the combined high frequency band component delivered from the combining portion 6324 so as to deliver the audio signal.

This in-water characteristic correction device 63fb is different from the in-water characteristic correction device 63f or the in-water characteristic correction device 63fa in that it performs reconstruction and combination of both the low frequency band component and the high frequency band component. However, other operations are the same so descriptions thereof will be omitted.

The audio signal of the sound collected in water has the low frequency band component and the high frequency band component that are different from those of the audio signal of sound collected in air, and they are affected largely from the sound collection characteristics of sounds in water. Therefore, with respect to the in-water characteristic correction devices 63f, 63fa and 63fb, the reconstructed component is combined with either the high frequency band component or the low frequency band component, or both of them of the audio signal, so that influence of the sound collection characteristics of the sound in water can be reduced. In other words, it is possible to make the signal effectively be close to the audio signal of the user's intention.

<Seventh Example of the In-Water Characteristic Correction Device>

Figure 26:
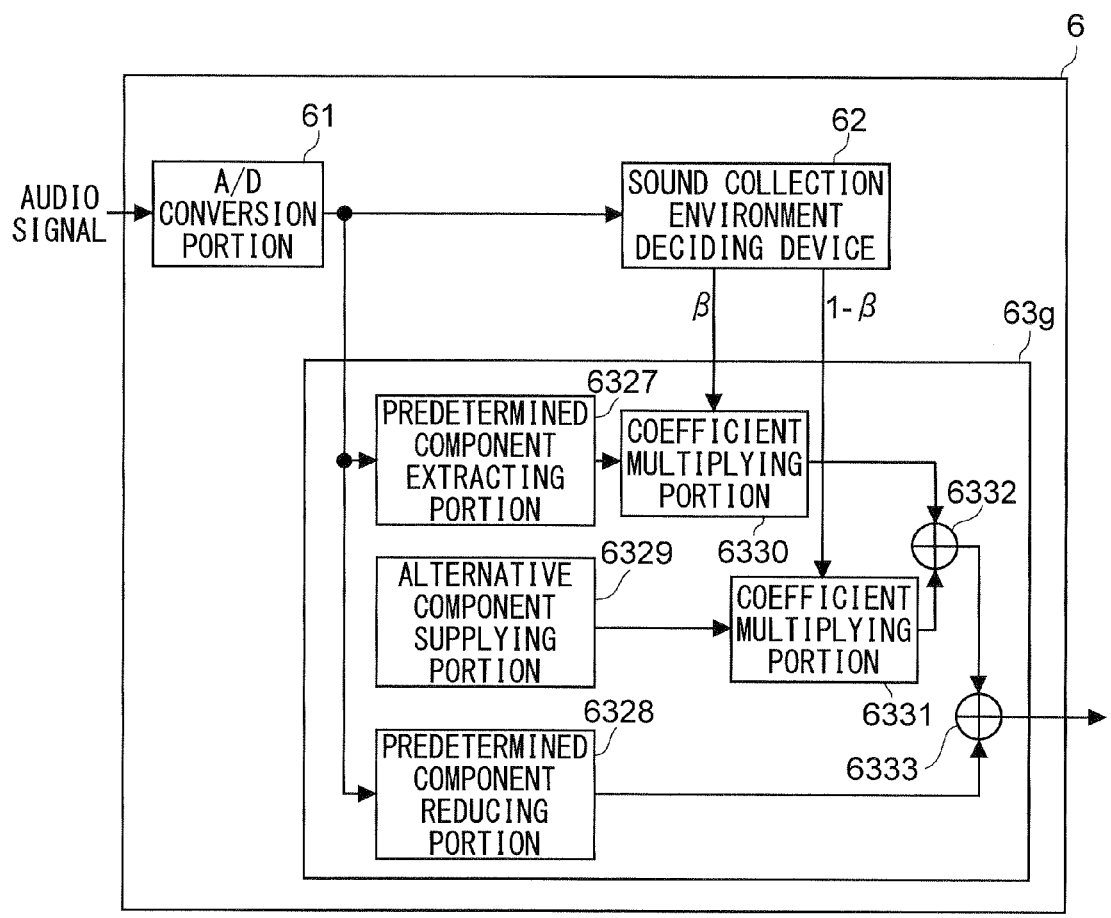
FIG. 26 is a block diagram showing a structure of a sound processing portion including an in-water characteristic correction device of a seventh example.

Next, a seventh example of the in-water characteristic correction device will be described with reference to the drawings. FIG. 26 is a block diagram showing a structure of the sound processing portion including the in-water characteristic correction device according to the seventh example. As shown in FIG. 26, the sound processing portion 6 includes the A/D conversion portion 61, the sound collection environment deciding device 62, and an in-water characteristic correction device 63g.

The in-water characteristic correction device 63g includes a predetermined component extracting portion 6327 for extracting a predetermined frequency component from the input audio signal so as to deliver a predetermined frequency band component, a predetermined component reducing portion 6328 for reducing the frequency component that is extracted by the predetermined component extracting portion 6327 from the input audio signal so as to deliver a non-predetermined frequency band component, an alternative component supplying portion 6329 for delivering an alternative component, a coefficient multiplying portion 6330 for multiplying a mixing coefficient β delivered from the sound collection environment deciding device 62 to the predetermined frequency band component delivered from the predetermined component extracting portion 6327, a coefficient multiplying portion 6331 for multiplying a mixing coefficient (1−β) delivered from the sound collection environment deciding device 62 to the alternative component delivered from the alternative component supplying portion, a combining portion 6332 for combining the predetermined frequency band component delivered from the coefficient multiplying portion 6330 with the alternative component delivered from the coefficient multiplying portion 6331 so as to deliver a combined predetermined frequency band component, and a combining portion 6333 for combining the combined predetermined frequency band component delivered from the combining portion 6332 with the non-predetermined frequency band component delivered from the predetermined component reducing portion so as to deliver the audio signal.

The sound collection environment deciding device 62 decides whether or not the sound of the input audio signal was collected in water by the method as described above. On the other hand, the in-water characteristic correction device 63g extracts the predetermined frequency band component of the input audio signal in the predetermined component extracting portion 6327. In addition, the predetermined component reducing portion 6328 reduces the predetermined frequency band component of the input audio signal so as to obtain the non-predetermined frequency band component. Furthermore, the alternative component supplying portion 6329 delivers the alternative component that is a component of a frequency band similar to the predetermined frequency band component. Then, the predetermined frequency band component extracted by the predetermined component extracting portion 6327 is supplied to the coefficient multiplying portion 6330, and the alternative component delivered from the alternative component supplying portion 6329 is supplied to the coefficient multiplying portion 6331.

If the sound collection environment deciding device 62 decides that the sound of the input audio signal was collected in water, the coefficient multiplying portion 6330 multiplies the mixing coefficient β to the input predetermined frequency band component so as to deliver the result. In addition, the coefficient multiplying portion 6331 multiplies the mixing coefficient (1−β) to the input alternative component so as to deliver the result. Then, the predetermined frequency band component to which the mixing coefficient β is multiplied and the alternative component to which the mixing coefficient (1−β) is multiplied are combined in the combining portion 6332 so that one combined predetermined frequency band component is delivered.

Then, the combined predetermined frequency band component delivered from the combining portion 6332 and the non-predetermined frequency band component delivered from the predetermined component reducing portion 6328 are combined in the combining portion 6333 so that one audio signal is delivered.

The alternative component delivered from the alternative component supplying portion 6329 is obtained, for instance, by extracting a frequency component similar to the predetermined frequency band component from the alternative signal obtained by sound collection in advance. This alternative component is a signal that the user desires to use as alternative, in an arbitrary manner. For instance, it may be obtained by collecting sounds in air in a quiet situation. In addition, it may be sound like bubbling water, artificial sound or silence.

Since the in-water characteristic correction device 63g is configured like this example, the signal of the predetermined frequency band component can be improved. In particular, it is possible to combine the alternative component that is not affected by the sound collection characteristics of sound in water (including a case of a little influence of the sound collection characteristics of sound in water like a little noise) with components of the low frequency band component in which intensity is concentrated when the sound collection is performed in water, the high frequency band component in which intensity is attenuated largely, the predetermined frequency band component including the self-generating drive sound in which sensitivity increases so that it is apt to be grating sound, and the like. Therefore, it is possible to reduce an influence of the sound collection characteristics in water from the audio signal of sound collected in water. In other words, it is possible to make the signal effectively be close to the audio signal of the user's intention.

Note that it is possible to replace the combination of the predetermined component extracting portion 6327 and the predetermined component reducing portion 6328 with a combination of the LPF and the HPF having the same cutoff frequency. In addition, it is possible that the predetermined component extracting portion 6327 is a BPF and that the predetermined component reducing portion 6328 is a BEF for cutting off components of the frequency band extracted by the BPF.

In addition, similar to the third example, it is possible to adopt another structure in which the alternative component supplying portion 6329 or the sound collection environment deciding device 62 detects occurrence of the self-generating drive sound (e.g., drive sound of the motor) so that combining of the alternative component is performed in accordance with occurrence of the self-generating drive sound. In addition, it is possible that the alternative component is the self-generating drive sound that is controlled to be a degree of not being grating sound.

In addition, if the alternative component is generated from the alternative signal obtained by sound collection in advance, it is possible to extract an appropriate part for using as the alternative component (e.g., a part that does not include a signal like noise and is stable at a constant intensity) from the audio signal obtained by sound collection in air for some period of time and to combine the same for generating the alternative signal. This structure for generating the alternative component from the alternative signal for combining the same enables to obtain the audio signal more effectively that meets the user's intention.

In addition, it is possible to record a plurality of alternative components and to deliver and combine them at random. This structure enables to decrease total time of the stored alternative components. Therefore, data quantity of the alternative component can be reduced, so that the device for recording the alternative component can be downsized. In addition, since the alternative component is not a repeated pattern of a predetermined pattern, a natural audio signal can be obtained.

In addition, it is possible to store the alternative component in the alternative component supplying portion 6329 or to store the alternative component in the memory 15 or the external memory 9 shown in FIG. 1. In addition, it is possible to store the alternative signal and to extract the alternative component that the alternative component supplying portion 6329 needs properly from the alternative signal so as to deliver the same to the coefficient multiplying portion 6331.

In addition, if the sound collection environment deciding device 62 decides that the sound was collected in water, the mixing coefficient $\beta$ may be decreased. On the contrary, if it decides that the sound was not collected in water, mixing coefficient $\beta$ may be increased. Further, if the sound collection environment deciding device 62 decides that the sound was not collected in water, the mixing coefficient $\beta$ may be set to one. If the mixing coefficient $\beta$ is set to one, the predetermined frequency band component delivered from the predetermined component extracting portion 6327 passes through the coefficient multiplying portion 6330 and the combining portion 6332 as it is and is supplied to the combining portion 6333. In other words, the combined predetermined frequency band component delivered from the combining portion 6332 becomes the same as the predetermined frequency band component. Further, in this case, it is possible to adopt the structure in which the alternative component supplying portion 6329 does not deliver the alternative component.

In addition, it is possible to decide deterioration degree of the input audio signal based on the input intensity of the audio signal or the like so that a value of the mixing coefficient $\beta$ is changed. In addition, if it is decided that the deterioration degree is large, the mixing coefficient $\beta$ may be decreased. In addition, it is possible that the mixing coefficient $\beta$ is zero.

In addition, although the alternative component is combined with the predetermined frequency component extracted by the predetermined component extracting portion 6327 in this example, it is possible to adopt another structure in which the alternative component or the alternative signal is combined in every frequency band.

<Eighth Example of the In-Water Characteristic Correction Device>

Figure 27:
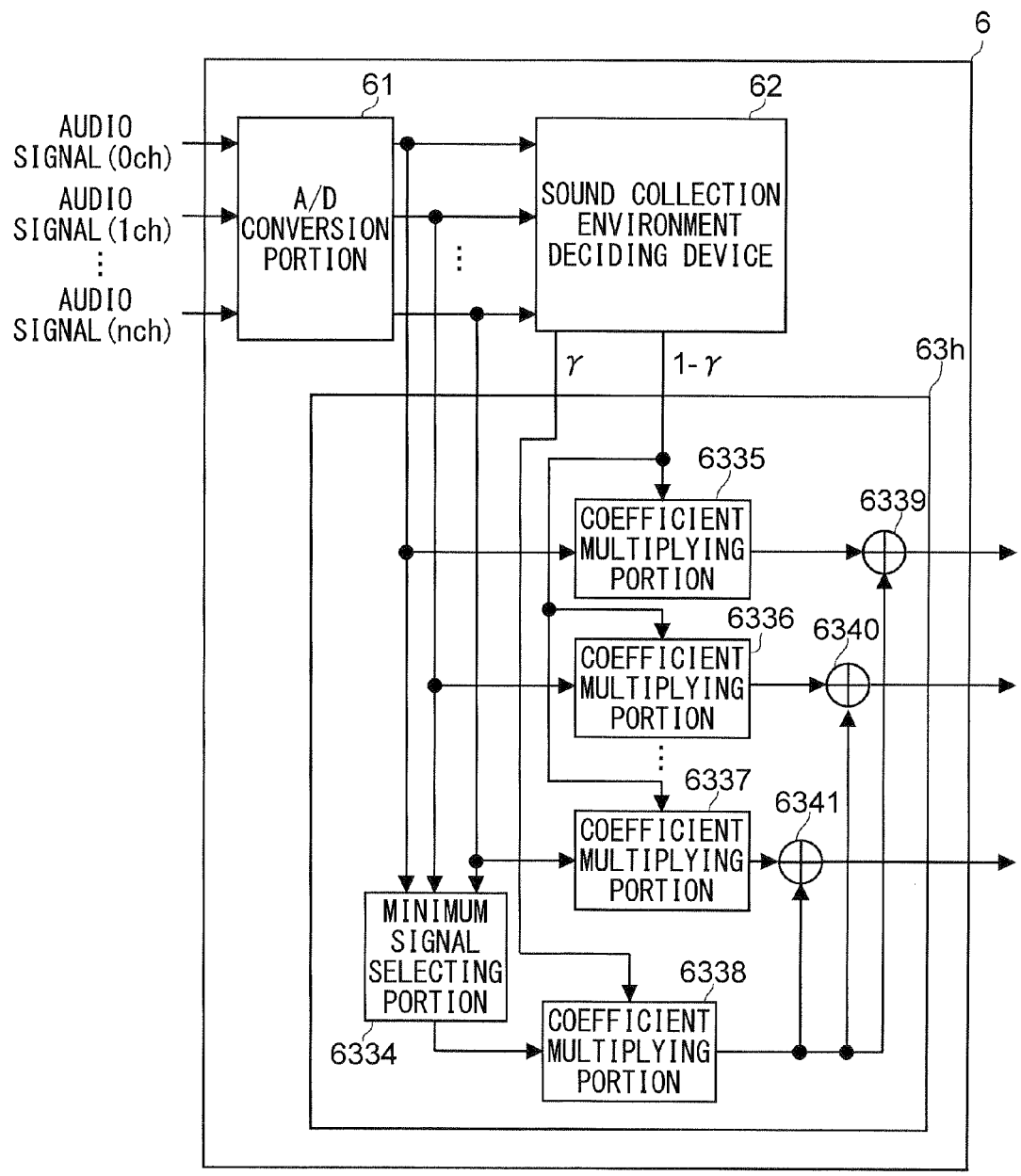
FIG. 27 is a block diagram showing a structure of a sound processing portion including an in-water characteristic correction device of an eighth example.

Next, an eighth example of the in-water characteristic correction device will be described with reference to the drawings. FIG. 27 is a block diagram showing a structure of a sound processing portion equipped with an in-water characteristic correction device of the eighth example. As shown in FIG. 27, the sound processing portion 6 includes the A/D conversion portion 61, the sound collection environment deciding device 62 and an in-water characteristic correction device 63h. In addition, the sound processing portion 6 is supplied with audio signals of n+1 channels of zero to n channels (here, n is a natural number).

The in-water characteristic correction device 63h includes a minimum signal selecting portion 6334 for selecting and delivering the audio signal having the lowest intensity from audio signals of a plurality of input channels, coefficient multiplying portions 6335 to 6337 for multiplying a mixing coefficient $(1-\gamma)$ to the audio signals of the plurality of input channels, respectively, a coefficient multiplying portion 6338 for multiplying a mixing coefficient $\gamma$ to the audio signal delivered from the minimum signal selecting portion 6334, and combining portions 6339 to 6341 for combining the audio signal delivered from each of the coefficient multiplying portions 6335 to 6337 with the audio signal delivered from the coefficient multiplying portion 6338 so as to deliver the result as the audio signal of each channel.

The sound collection environment deciding device 62 decides whether or not the sound of the input audio signal was collected in water by the method as described above. On the other hand, the in-water characteristic correction device 63h selects the audio signal having the lowest intensity from the plurality of input audio signals in the minimum signal selecting portion 6334. The selected audio signal is supplied to the coefficient multiplying portion 6338. In addition, the audio signal of each channel supplied to the in-water characteristic correction device 63h is also supplied to each of the coefficient multiplying portions 6335 to 6337.

If the sound collection environment deciding device 62 decides that the sound of the input audio signal was collected in water, the coefficient multiplying portion 6338 multiplies the mixing coefficient $\gamma$ to the audio signal delivered from the minimum signal selecting portion 6334 and delivers the result. In addition, each of the coefficient multiplying portions 6335 to 6337 multiplies the mixing coefficient $(1-\gamma)$ to the audio signal of each input channel. Then, the audio signal to which the mixing coefficient $\gamma$ is multiplied and the audio signal of each input channel to which the mixing coefficient $(1-\gamma)$ is multiplied are combined in each of the combining portions 6339 to 6341 so that the audio signal of each channel is delivered.

Since the in-water characteristic correction device 63h is configured as described in this example, noise can be reduced even if noise with high intensity is included in the audio signal of collected sound of any channel of the microphone. In particular, since water pressure is exerted on the microphone in water, the audio signal obtained by collecting sound may include noise with high intensity at random. However, if the audio signal having the lowest intensity is combined with the audio signal of each channel at a predetermined ratios (mixing coefficients $\gamma$ and $(1-\gamma)$) as described in this example, noise with high intensity included in the audio signal of any channel can be reduced by combining it with the audio signal of another channel (the audio signal with the lowest intensity, i.e., the audio signal of the channel that is assumed not to include noise with high intensity). Therefore, it is possible to reduce an influence of the sound collection characteristics in water from the audio signal of sound collected in water. In other words, it is possible to make the signal effectively be close to the audio signal of the user's intention.

Note that the value of $\gamma$ may be one. If the value of $\gamma$ is one, the audio signals of all channels are unified to be the audio signal of the lowest intensity. In other words, it can be a monophonic audio signal, so that the audio signal of the channel that has high intensity and is assumed to include noise can be eliminated.

In addition, it is possible to increase the mixing coefficient $\gamma$ if the sound collection environment deciding device 62 decides that the sound was collected in water and to decrease the mixing coefficient $\gamma$ if it decides that the sound was not collected in water. Furthermore, the mixing coefficient $\gamma$ may be set to zero if the sound collection environment deciding device 62 decides that the sound was not collected in water. If the mixing coefficient $\gamma$ is set to zero, the audio signal of each input channel is delivered after passing through the coefficient multiplying portions 6335 to 6337 and the combining portions 6339 to 6341 as it is. Further, in this case, it is possible that the audio signal is not selected and delivered in the minimum signal selecting portion 6334.

In addition, it is possible to change a value of the mixing coefficient γ based on the input intensity of the audio signal. Furthermore, it is possible to set the mixing coefficient for each of the coefficient multiplying portions 6335 to 6337. In this case, the ratio of combination is adjusted for each audio signal of each channel.

In addition, although combination of the entire audio signal is described in the example described above, it is possible to perform the combination only for the component of the predetermined frequency band of the audio signal. In this structure, the component of the predetermined frequency band of the audio signal of each channel is supplied to each of the minimum signal selecting portion 6334 and the coefficient multiplying portions 6335 to 6337. In addition, each of the combining portions 6339 to 6341 delivers the component of the predetermined frequency band of each audio signal. In this case, it is possible to dispose the predetermined component extracting portion for extracting the component of the predetermined frequency band before each of the minimum signal selecting portion 6334 and the coefficient multiplying portions 6335 to 6337. In addition, it is possible to dispose the combining portion after the combination after each of the combining portions 6339 to 6341 for combining the component of the predetermined frequency band to the audio signal of each channel.

<Combination of Examples of the In-Water Characteristic Correction Device>

The in-water characteristic correction devices 63a to 63h of the examples described above can be embodied in a combined manner. If they are combined, effects of the examples can be obtained. Cases of the combination may include the case where the combination is performed simultaneously (e.g., if the first example and the second example are combined, the amplifying portion 6307 shown in FIG. 13 is disposed between the HPF 6302 and the combining portion 6304 shown in FIG. 12) and the case where the combination is performed in a multistage manner (e.g., if the first example and the fourth example is combined, the smoothing portion 6310 shown in FIG. 16 is connected to the output of side of the combining portion 6304 shown in FIG. 12).

<<Application to a Reproducing Mode>>

The above-mentioned imaging apparatus shown in FIG. 1 is an imaging apparatus including the sound collection environment deciding device in which the sound collection environment deciding method of the present invention is applied to record of the audio signal of collected sound. If it is decided that the sound was collected in water, characteristic correction suitable for the in-water environment is performed on the audio signal of collected sound. The audio signal after the characteristic correction is compressed and stored in the external memory 22.

However, the sound collection environment deciding method according to the present invention performs the sound collection environment decision utilizing the audio signal of collected sound. Therefore, it is not always necessary to decide whether to be in water or not when the audio signal of collected sound is recorded. It is possible to perform the sound collection environment decision when it is reproduced by utilizing the audio signal of collected sound. It is possible to record and reproduce the audio signal of collected sound and to perform the sound collection environment decision utilizing the reproduced audio signal. In other words, the timing for performing the sound collection environment decision in the present invention is not limited to the timing when the audio signal of collected sound is recorded, but it can be the timing when the audio signal is reproduced. As described above, since the sound collection environment deciding method according to the present invention does not limit the timing for performing the sound collection environment decision to the timing when the audio signal of collected sound is recorded, the sound collection environment decision can be performed at either timing when the audio signal of collected sound is recorded or when the recorded audio signal is reproduced, in accordance with the other process performed by utilizing video and audio information.

Figure 28:
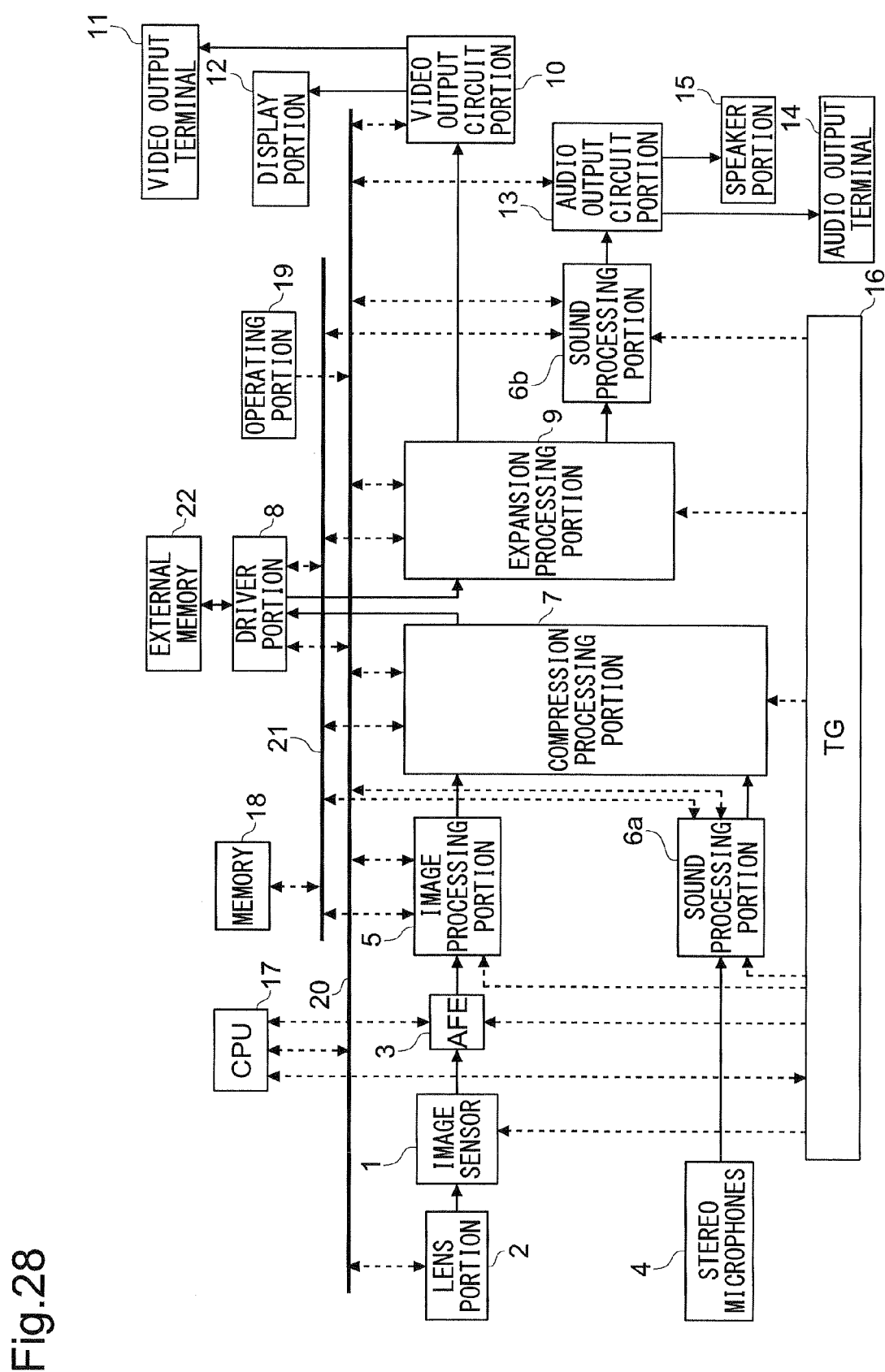
FIG. 28 is a block diagram showing another example of the internal structure of the electronic appliance (imaging apparatus) according to the present invention.

Hereinafter, an imaging apparatus equipped with the sound collection environment deciding device to which the sound collection environment deciding method of the present invention is applied at the reproduction timing will be described. FIG. 28 is a block diagram showing another example of the inner structure of the electronic appliance (imaging apparatus) according to the present invention. Note that the parts in FIG. 28 that are substantially the same as those in FIG. 1 are denoted by the same reference numerals.

The imaging apparatus shown in FIG. 28 is different from the imaging apparatus shown in FIG. 1 in that a sound processing portion 6a is disposed instead of the sound processing portion 6 and that a sound processing portion 6b is disposed between the expansion processing portion 9 and the audio output circuit portion 13.

Unlike the sound processing portion 6, the sound processing portion 6a performs A/D conversion on the audio signal that is an analog signal from the stereo microphones 4 but does not include the sound collection environment deciding device according to the present invention and the in-water characteristic correction device for performing the characteristic correction suitable for the in-water environment on the audio signal of collected sound when the sound collection environment deciding device according to the present invention decides that the sound was collected in water.

In addition, the sound processing portion 6a may receive time information concerning drive timing of the motor for changing the optical zoom magnification in the lens portion 2 from the CPU 17 and may deliver to the compression processing portion 7 the audio signal to which the time information is added as an index.

The sound processing portion 6b has a structure similar to the sound processing portion 6 except for that it does not include the A/D conversion portion and that it does not receive the time information about the drive timing of the motor for changing the optical zoom magnification in the lens portion 2 externally but obtains the time information as necessity from the index that is added to the audio signal. The sound processing that is performed in the sound processing portion 6b is basically the same as the sound processing performed in the sound processing portion 6, so description thereof will be omitted.

In addition, it is possible to apply this example to a reproducing apparatus having only reproducing function (e.g., a reproducing apparatus or the like for reproducing image signals and audio signals recorded on an optical disc). In this structure, too, the sound collection environment decision based on the audio signal and the in-water characteristic correction process can be performed.

<<Variations>>

In the above-mentioned imaging apparatus shown in FIG. 1 or 28, the characteristic correction suitable for the in-water environment is performed on the audio signal of collected sound (including the signal obtained by recording and reproducing the audio signal of collected sound) if it is decided that the sound was collected in water. Instead, however, it is possible to perform the characteristic correction suitable for the in-water environment on a video signal of an image (including the signal obtained by recording and reproducing the video signal of an image) or to perform the characteristic correction suitable for the in-water environment concerning camera control for imaging when it is decided that the sound was collected in water.

In addition, it is possible to adopt a structure in which the user can set a normal mode and an in-water mode by operation of the operating portion 19. The normal mode is a mode in which the correction process suitable for the in-water environment is not performed, and the in-water mode is a mode in which the correction process suitable for the in-water environment is performed.

In this case, the correction process based on a result of the sound collection environment decision utilizing the audio signal of collected sound may not match setting of the normal mode or the in-water mode performed by the user. From the viewpoint of enabling to perform an appropriate process automatically even if the user forgot to switch the mode, the correction process based on a result of the sound collection environment decision utilizing the audio signal of collected sound should have higher priority than the setting of the normal mode/in-water mode performed by the user. On the other hand, for instance, from the viewpoint of supporting the user's requirement to record the audio signal as raw data by the imaging apparatus shown in FIG. 1 even in the case where the sound collection is performed in water, the setting of the normal mode or the in-water mode performed by the user should have higher priority than the correction process based on the result of the sound collection environment decision utilizing the audio signal of collected sound. Note that it is desirable that which of them has higher priority can be changed by the operation of the operating portion 19.

In addition, although the characteristic correction suitable for the in-water environment is performed on the audio signal of collected sound if it is decided that the sound was collected in water, it is possible not to perform the characteristic correction suitable for the in-water environment on the video signal of the image or the characteristic correction suitable for the in-water environment concerning camera control for imaging, so that the block related to the video is not necessary in particular. Therefore, the present invention can be applied to an electronic appliance other than the imaging apparatus, for instance, a sound recording apparatus, a sound reproducing apparatus, a sound recording and reproducing apparatus (e.g., an IC Recorder) or the like.

In addition, it is desirable that the electronic appliance equipped with the sound collection environment deciding device according to the present invention has a waterproof structure, but it is possible to adopt a structure other than the waterproof structure, in which an external microphone housed in a waterproof housing for making the microphone waterproof is used so that the audio signal of collected sound is supplied.

In addition, the audio signal that is processed in the sound collection environment deciding device or in the in-water characteristic correction device may be a signal on the time axis or a signal on the frequency axis.

In addition, as for the imaging apparatus according to the embodiment of the present invention, each operation in the sound collection environment deciding device and the in-water characteristic correction device of the sound processing portion may be performed by a control device such as a microcomputer. Further, it is possible to describe the entire or a part of the functions realized by the control device as a program and to execute the program on a program executing device (e.g., a computer) so that the entire or a part of the function can be realized.

In addition, without limiting to the case described above, the imaging apparatus and the sound processing portion 6, 6a and 6b shown in FIGS. 1 and 28 can be realized by hardware or a combination of hardware and software. In addition, if the imaging apparatus and the sound processing portion 6 are configured by using software, the block diagram of the part realized by software shows a function block diagram of the part.

Although embodiments of the present invention are described above, the scope of the present invention is not limited to the embodiments, which can be modified variously within the scope of the present invention without deviating from the same.

The present invention can be applied to an electronic appliance for recording and/or reproducing audio signals (e.g., an imaging apparatus or an IC Recorder) or the like.

What is claimed is:

1. A sound collection environment deciding method, comprising:
    a step of calculating, based on an audio signal of collected sound, at least one of an indicator related to frequency characteristics of the audio signal and an indicator related to propagation characteristics of the audio signal; and
    a step of deciding, based on the indicator, whether the audio signal was collected in air or in water and outputting a result of the decision.

2. A sound collection environment deciding device, comprising:
    a calculator which receives an audio signal of collected sound and which, based on the audio signal, calculates at least one of an indicator related to frequency characteristics of the audio signal and an indicator related to propagation characteristics of the audio signal; and
    a decider which, based on the indicator calculated by the calculator, decides whether the audio signal was collected in air or in water and which outputs a result of the decision.

3. An electronic appliance equipped with the sound collection environment deciding device according to claim 2, wherein the electronic appliance performs characteristic correction suitable for the in-water environment if the sound collection environment deciding device decides that the sound was collected in water.

4. The electronic appliance according to claim 3, wherein the electronic appliance performs at least one of suppression of gain and correction of frequency characteristics on the audio signal of collected sound if the sound collection environment deciding device decides that the sound was collected in water.

5. The electronic appliance according to claim 3, wherein
    the electronic appliance includes at least one of a recording portion for recording the audio signal of collected sound and a reproducing portion for reproducing the same, and
    the sound collection environment deciding device performs the decision process when the audio signal of collected sound is recorded or when the recorded audio signal is reproduced.

6. The electronic appliance according to claim 5, wherein
    the electronic appliance is an imaging apparatus including a camera for taking an image, and
    if the sound collection environment deciding device decides that the sound was collected in water, the electronic appliance performs the characteristic correction suitable for the in-water environment on at least one of video information obtained by the camera and camera control information for controlling the camera.

7. The electronic appliance according to claim 3, wherein the electronic appliance indicates information related to a result of the decision performed by the sound collection environment deciding device to a user.

8. The electronic appliance according to claim 7, wherein
the sound collection environment deciding device is a device utilizing a plurality of audio signals of collected sound so as to decide whether the sound was collected in air or in water for each of the unitized audio signals, and
the electronic appliance indicates warning information to the user if the result of the decision is different among the audio signals that were utilized by the sound collection environment deciding device.

9. The electronic appliance according to claim 7, wherein the electronic appliance is an imaging apparatus including a camera for taking an image.

10. A sound processing device comprising:
a sound collection environment deciding device according to claim 2; and
an in-water characteristic correction device for performing an in-water characteristic correction process for reducing influence of sound collection characteristics of sound in water from an audio signal on an input audio signal, wherein
if the sound collection environment deciding device decides that the sound of the input audio signal was collected in water, the in-water characteristic correction device performs the in-water characteristic correction process on the input audio signal.

11. The sound processing device according to claim 10, wherein
the in-water characteristic correction device includes an attenuation portion for attenuating the input audio signal, and
the in-water characteristic correction process includes a process of attenuating components having frequencies below a first frequency of the audio signal by the attenuation portion.

12. The sound processing device according to claim 10, wherein
the in-water characteristic correction device includes an amplifying portion for amplifying the input audio signal, and
the in-water characteristic correction process includes a process of amplifying components having frequencies above a second frequency of the audio signal by the amplifying portion.

13. The sound processing device according to claim 10, wherein
the in-water characteristic correction device includes a smoothing portion for smoothing the input audio signal, and
the in-water characteristic correction process includes a process of smoothing the audio signal by the smoothing portion.

14. The sound processing device according to claim 10, further comprising an AGC portion for monitoring and adjusting input intensity of the audio signal on a unit of a predetermined time, wherein
the in-water characteristic correction device includes a response speed control portion for controlling a length of the predetermined time of the AGC portion, and
the in-water characteristic correction process includes a process of decreasing the length of the predetermined time of the AGC portion by the response speed control portion.

15. The sound processing device according to claim 10, wherein
the in-water characteristic correction device includes a combining portion for combining the input audio signal with a predetermined signal, and
the in-water characteristic correction process includes a process of combining the audio signal with the predetermined signal by the combining portion.

16. An electronic appliance equipped with the sound processing device according to claim 10, wherein the electronic appliance corrects an audio signal obtained by sound collection, by using the sound processing device.

17. The electronic appliance according to claim 16 further comprising a control portion for controlling operation of the appliance itself, wherein
the in-water characteristic correction device provided to the sound processing device includes a predetermined signal attenuation portion working based on control information delivered from the control portion when the control portion lets the appliance itself operate, so as to attenuate components of a predetermined frequency band in the input audio signal, and
the in-water characteristic correction process includes a process of attenuating components of the predetermined frequency band by the predetermined signal attenuation portion.

18. A sound processing method comprising:
a first step of deciding whether or not sound of an input audio signal was collected in water based on the input audio signal; and
a second step of performing an in-water characteristic correction process on the input audio signal so as to reduce influence of sound collection characteristics of sound in water from the audio signal if it is decided that the sound of the input audio signal was collected in water in the first step,
wherein the first step includes a step of calculating, based on the input audio signal, at least one of an indicator related to frequency characteristics of the audio signal and an indicator related to propagation characteristics of the audio signal; and a step of deciding, based on the indicator, whether the audio signal was collected in air or in water.

* * * * *